(12) United States Patent
Pellegrino et al.

(10) Patent No.: US 7,263,806 B2
(45) Date of Patent: Sep. 4, 2007

(54) STORAGE RACK VIBRATION ISOLATORS AND RELATED STORAGE RACKS

(75) Inventors: John B. Pellegrino, Erie, PA (US); James A. Courtwright, North East, PA (US); Robert Michael, Erie, PA (US)

(73) Assignee: Ridg-U-Rak, INc., North East, PA (US)

( * ) Notice: Subject to any disclaimer, the term of this patent is extended or adjusted under 35 U.S.C. 154(b) by 3 days.

(21) Appl. No.: 11/279,138

(22) Filed: Apr. 10, 2006

(65) Prior Publication Data

US 2006/0254997 A1    Nov. 16, 2006

Related U.S. Application Data

(60) Provisional application No. 60/762,908, filed on Jan. 27, 2006, provisional application No. 60/670,474, filed on Apr. 11, 2005.

(51) Int. Cl.
*E04B 1/98* (2006.01)
*F16M 13/00* (2006.01)

(52) U.S. Cl. ..................... 52/167.8; 248/564

(58) Field of Classification Search ........... 211/26, 211/189, 191; 267/153, 294, 141.1; 52/167.1–167.9, 52/573.1; 248/559, 562, 564–566, 570, 635, 248/636, 638
See application file for complete search history.

(56) References Cited

U.S. PATENT DOCUMENTS 1,572,574 A    2/1926  Stromborg 2,660,387 A *  11/1953  Roy ........................ 248/574
3,342,447 A    9/1967   Marsh (Continued)

FOREIGN PATENT DOCUMENTS

IT    0001327395    8/2002

(Continued)

OTHER PUBLICATIONS

"Seismic Considerations for Steel Storage Racks Located in Areas Accessible to the Public," *FEMA 460*—Sep. 2005, Prepared by the Building Seismic Safety Council for FEMA, 172 pages. See cover letter for explanation.

*Primary Examiner*—Jennifer E. Novosad
(74) *Attorney, Agent, or Firm*—Edward W. Goebel, Jr.; Jon L. Woodard; MacDonald Illig Jones & Britton LLP

(57) ABSTRACT

A storage rack vibration isolator for a storage rack system installed on a floor comprising a first mounting plate connectable to the storage rack system, a second mounting plate connectable to the floor. An elastomeric component extending between these mounting plates and is operatively attached to them so that during seismic events the first and second mounting plates remain attached to the elastomeric component as the elastomeric component is placed in shear while the first and second mounting plates are able to move in planes substantially parallel to each other. The elastomeric component comprises at least one elastomeric member made of material that is capable of absorbing and dissipating the energy of ground movement imparted to the storage rack system during seismic events, while the material enables the storage rack system to move a sufficient distance relative to the floor to lower the natural frequency of the storage rack system in at least one horizontal direction.

43 Claims, 31 Drawing Sheets

U.S. PATENT DOCUMENTS

| | | | |
|---|---|---|---|
| 3,554,855 A | 1/1971 | Oberst et al. | |
| 3,806,975 A | 4/1974 | Fyfe | |
| 3,921,240 A | 11/1975 | Fyfe | |
| 4,117,637 A | 10/1978 | Robinson | |
| 4,187,573 A | 2/1980 | Fyfe et al. | |
| 4,226,677 A | 10/1980 | Saito et al. | |
| 4,499,694 A | 2/1985 | Buckle et al. | |
| 4,527,365 A | 7/1985 | Yoshizawa et al. | |
| 4,593,501 A | 6/1986 | Delfosse | |
| 4,633,628 A | 1/1987 | Mostaghel | |
| 4,727,695 A | 3/1988 | Kemeny | |
| 4,731,966 A | 3/1988 | Fujita et al. | |
| 4,761,925 A | 8/1988 | Fukahori et al. | |
| 4,766,706 A | 8/1988 | Caspe | |
| 4,830,927 A | 5/1989 | Fukahori et al. | |
| 4,899,323 A | 2/1990 | Fukahori et al. | |
| 4,910,930 A * | 3/1990 | Way | 52/167.1 |
| 4,933,238 A | 6/1990 | Fukahori et al. | |
| 4,942,703 A | 7/1990 | Nicolai | |
| 4,950,528 A | 8/1990 | Iizuka et al. | |
| 4,978,581 A | 12/1990 | Fukahori | |
| 4,991,366 A * | 2/1991 | Teramura et al. | 52/167.8 |
| 5,014,474 A * | 5/1991 | Fyfe et al. | 52/167.8 |
| 5,054,251 A | 10/1991 | Kemeny | |
| 5,195,716 A | 3/1993 | Tyler | |
| 5,242,147 A | 9/1993 | Kemeny | |
| 5,597,240 A | 1/1997 | Fyfe | |
| 5,682,712 A | 11/1997 | Kemeny | |
| 5,761,856 A | 6/1998 | Kishizono et al. | |
| 5,797,228 A * | 8/1998 | Kemeny | 52/167.7 |
| 5,881,507 A | 3/1999 | Yoo et al. | |
| 5,946,866 A | 9/1999 | Wegiewski et al. | |
| 6,223,483 B1 | 5/2001 | Tsukagoshi | |
| 6,931,800 B2 | 8/2005 | Sedrak | |

FOREIGN PATENT DOCUMENTS

| | | | |
|---|---|---|---|
| WO | WO 2005/049942 A1 | 6/2005 | |

* cited by examiner

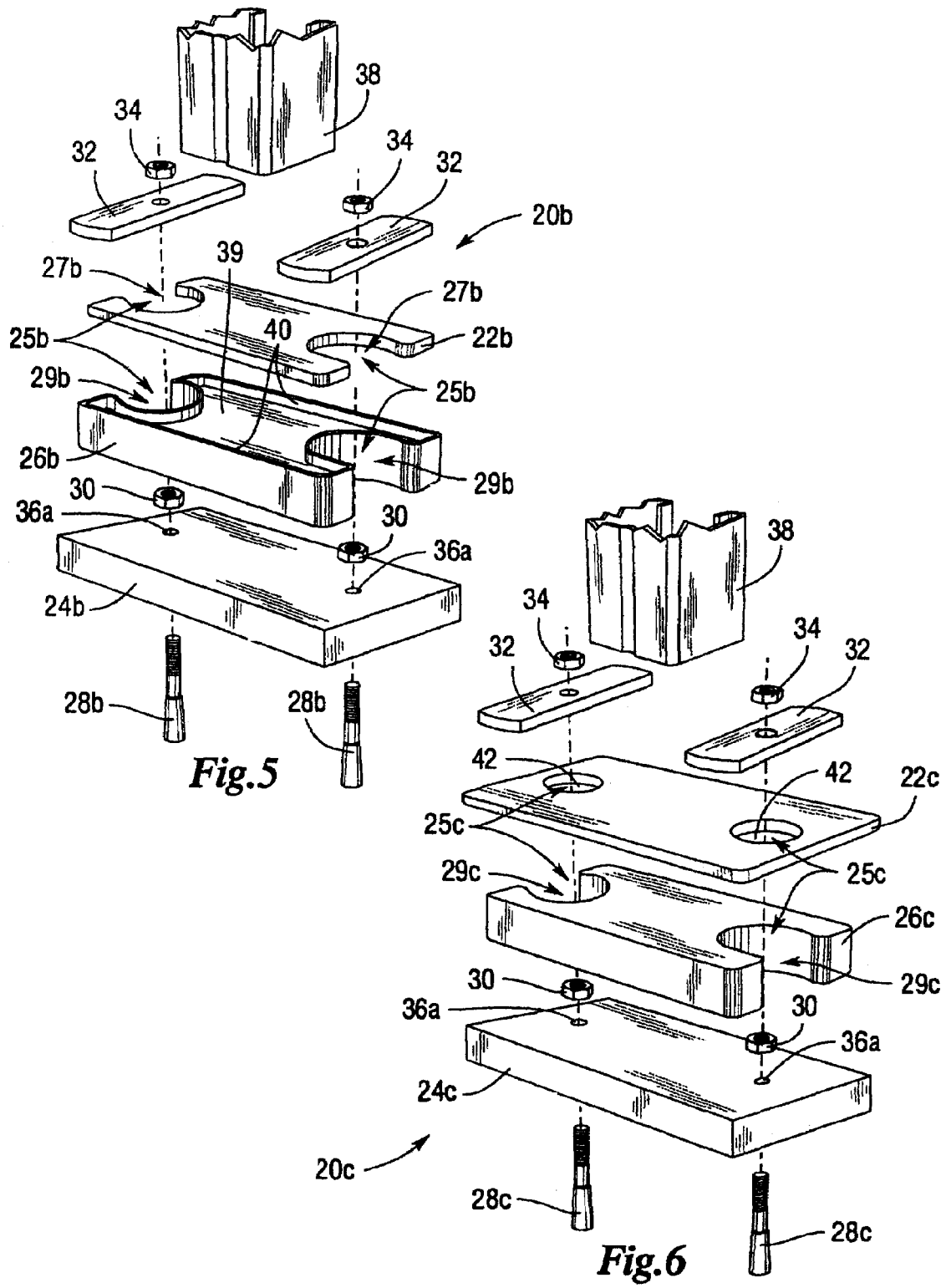

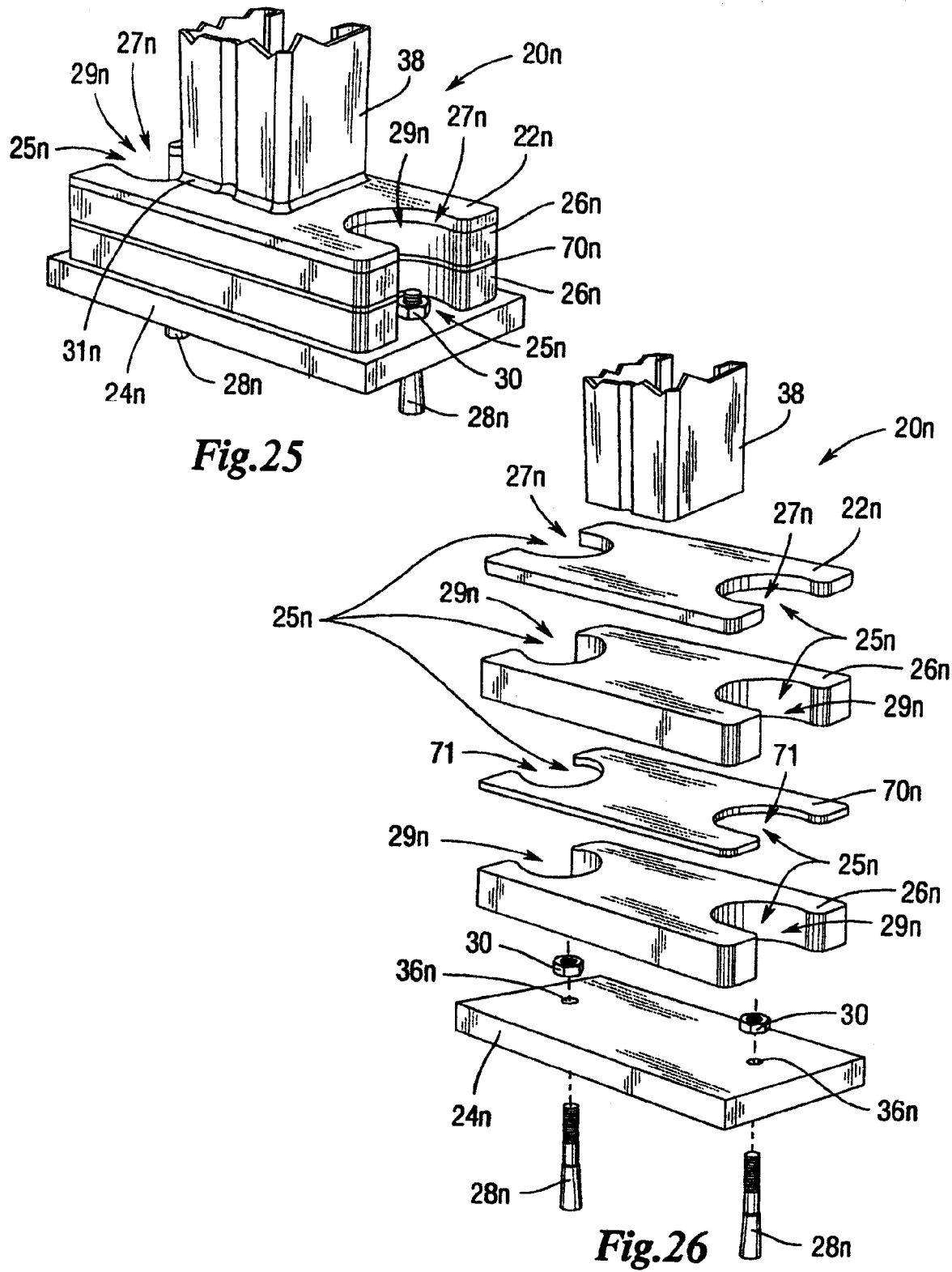

STORAGE RACK VIBRATION ISOLATORS AND RELATED STORAGE RACKS

This application takes priority from U.S. provisional applications 60/670,474 filed on Apr. 11, 2005, and 60/762,908 filed on Jan. 27, 2006, which are incorporated herein by reference.

BACKGROUND

Commercial and industrial storage rack systems are designed to hold various quantities of items and materials of different sizes, shapes and weights. While they vary in structure, storage rack systems normally include a series of interconnected steel columns, each of which rests on a solid floor such as a large slab of concrete. Beams are normally installed across adjacent pairs of columns. Shelving or pallets installed across pairs of beams normally hold the items or materials being stored. The columns bear the weight of the stored items or materials and transfer that weight to a base at the bottom of each column and from the base to the floor on which the columns are installed.

Storage rack systems can be installed in outdoor areas, factories, warehouses and large box retail stores located in all geographic areas. In some of these areas, storage rack systems are subjected to potentially significant seismic forces resulting from earthquakes. While storage rack systems can withstand the vibrations caused by low and moderate levels of seismic forces, increased levels of seismic forces can cause damage to storage rack systems or can cause items or materials to fall off the shelves or pallets of the storage rack systems on which they are stored.

SUMMARY

The effects of seismic forces on a storage rack system mounted on a floor are reduced through the use of storage rack vibration isolators constructed according to this invention and installed on the storage rack systems. According to one embodiment, a storage rack vibration isolator comprises a first mounting plate connectable to the storage rack system, a second mounting plate connectable to the floor, and an elastomeric component extending between and operatively attached to said first and second mounting plates. During seismic events the first and second mounting plates remain attached to the elastomeric component while the first and second mounting plates are able to move in planes substantially parallel to each other. The elastomeric component is made up of at least one elastomeric member made of material that is capable of absorbing and dissipating the energy of ground movement imparted to the storage rack system during seismic events so as to lower the natural frequency of the storage rack system in at least one horizontal direction.

Controlling the stiffness characteristics of the elastomeric members within certain preselected limits can optimize the reduction of the seismic forces on a storage rack system. The elastomeric component could be chosen to reduce the natural frequency of the storage rack system to about 0.9 Hz or less or ideally to about 0.5 Hz or less. The elastomeric member could also be made from material that has a damping loss factor greater than about 0.1.

According to another embodiment, the storage rack vibration isolator also comprises a first mounting plate connectable to the storage rack system, a second mounting plate connectable to the floor, and an elastomeric component extending between and operatively attached to said first and second mounting plates such that during seismic events the first and second mounting plates remain attached to the elastomeric component while the first and second mounting plates are able to move in planes substantially parallel to each other. In this embodiment the elastomeric component is made up of at least two elastomeric members with at least one intermediate plate positioned between every two of the at least two elastomeric members.

The elastomeric members could be made of material such as polyisoprene, polyisoprene blend, butyl rubber, acryl rubber, polyurethane, flurorubber, polysulfide rubber, ethylene-propylene rubber (EPR and EPDM), Hypalon, chlorinated polyethylene, ethylene-vinyl acetate rubber, epichlorohydrin rubber, chloroprene rubber, silicone, or other heavily damped elastomer.

According to various other embodiments, an advantage can be obtained by using a structure to restrict the movement of the elastomeric component of the storage rack vibration isolator to substantially one horizontal direction, or to substantially restrict its movement in the vertical direction, or substantially restrict its movement in both the one horizontal direction and in the vertical direction. Nevertheless, even with such substantial restriction of movement, there is some advantage to allow a limited amount of movement in the restricted directions.

In a storage rack system with a plurality of columns installed on a floor, that is constructed according to this invention, at least one of the storage rack vibration isolators described herein is connected to the storage rack system and to the floor. The plurality of columns have lower ends that are moveable with respect to the floor. The at least one storage rack vibration isolator comprises a first mounting plate connectable to the storage rack system, a second mounting plate connectable to the floor, and an elastomeric component extending between and operatively attached to said first and second mounting plates. During seismic events the first and second mounting plates remain attached to the elastomeric component while the first and second mounting plates are able to move in planes substantially parallel to each other. The elastomeric component is made up of at least one elastomeric member made of material that is capable of absorbing and dissipating the energy of ground movement imparted to the storage rack system during seismic events so as to lower the natural frequency of the storage rack system in at least one horizontal direction.

The storage rack vibration isolator or isolators could be mounted between the lower end of one or more of the columns and the floor. Alternatively, the storage rack vibration isolator or isolators are mounted adjacent the lower end of one or more of the columns Those skilled in the art will realize that this invention is capable of embodiments that are different from those shown and that details of the structure of the enclosed storage rack vibration isolators and storage rack systems can be changed in various manners without departing from the scope of this invention. Accordingly, the drawings and descriptions are to be regarded as including such equivalent storage rack vibration isolators and storage rack systems as do not depart from the spirit and scope of this invention.

BRIEF DESCRIPTION OF THE DRAWINGS

For a more complete understanding and appreciation of this invention, and its many advantages, reference will be made to the following detailed description taken in conjunction with the accompanying drawings.

FIG. 5 is an exploded view of a storage rack vibration isolator welded to the bottom of a rack column;

FIG. 6 is an exploded view of a storage rack vibration isolator welded to the bottom of a rack column;

FIG. 25 is a perspective view of another storage rack vibration isolator fastened to a base plate welded to the bottom of a storage rack column;

FIG. 26 is an exploded view of the storage rack vibration isolator shown in FIG. 25;

DETAILED DESCRIPTION

Figure 1:
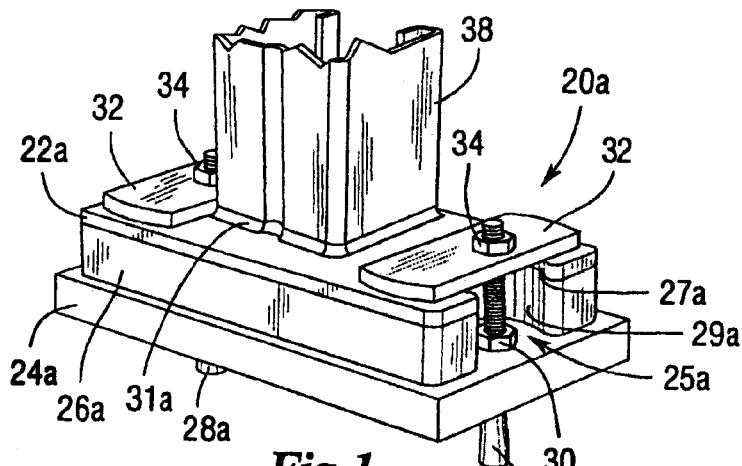
FIG. 1 is a perspective view of a storage rack vibration isolator welded to the bottom of a storage rack column.

Referring to the drawings, some of the reference numerals are used to designate the same or corresponding parts through several of the embodiments and figures shown and described. Variations in corresponding parts are denoted in specific embodiments with the addition of lowercase letters. Subsequent variations in components that are depicted in the figures but have not been described are intended to correspond to the specific embodiments mentioned earlier and are discussed to the extent that they vary in form or function. It will be understood that generally variations in the embodiments could be interchanged without deviating from the invention.

Every storage rack system has a natural frequency based on how the structure is designed and built. The natural frequency of the storage rack system is also related to its stiffness and provides clues as to how the storage rack system will behave in a seismic event. Typically a storage rack system is more flexible (i.e. it has a lower natural frequency) in the down-aisle direction and less flexible (i.e. it has a higher natural frequency) in the cross-aisle direction. It has been determined that typical upright frame storage racks manufactured by Ridg-U-Rak, Inc. have natural frequencies of about 0.9 Hz in the down-aisle direction and about 1.6 Hz in the cross-aisle direction. It is expected that most storage racks systems are similarly designed and are similarly more rigid in the cross-aisle direction than a down-aisle direction. During a seismic event, the storage racks vibrate to counteract the stresses imparted on the storage racks from ground movement such that the storage racks will move in response to an earthquake. The vibrations imparted on the storage rack system increase depending on the strength of the earthquake, but storage rack systems will typically experience some damage when the frequency of vibrations imparted from an a seismic event go over 1.5 Hz. As typical storage rack systems already have a natural frequency of 1.6 Hz in the cross-aisle direction, it does not take a strong earthquake to damage them.

Lowering the natural frequency of the storage rack system will decrease the effect of seismic events. In order to do this, additional flexibility must be given to the storage rack system without sacrificing its stability and strength. This can be accomplished by essentially leaving the structure of the storage rack untouched while modifying how the storage rack is attached to the floor. Storage rack vibration isolators coupled to the floor and attached to the storage racks serve as the interface between the floor and the storage rack such that the storage racks are now connected in one way or another to the storage racks vibration isolators and not directly attached to the floor.

One of the ways to reduce the natural frequency of the storage rack system is to allow the storage rack system to move a selected distance back and forth in response to the ground movement during seismic events. Such movement, or compliance, increases the overall flexibility of the storage rack system and serves to dissipate the energy imparted to the storage rack system from earthquakes. However, the acceleration experienced by the storage rack system during this movement is also transmitted to the product stored on the shelves, and if it is not tied down to the storage rack shelves, there is a risk that the product could fall off the racks. Therefore another consideration in the design of the storage rack vibration isolators across a range of seismic events is to control the acceleration of the storage rack system such that sufficient movement is achieved to reduce the natural frequency to a desired level, while at the same time not exceeding an acceleration threshold over which product will fall off the shelves.

Dissipation of the energy imparted to the storage rack system from ground movement during an earthquake is achieved through energy dissipation as a result of hysteresis losses and/or secondary friction as the vibration isolators move a sufficient distance back and forth to reduce the natural frequency of the storage rack system when the storage rack system moves in response to the earthquake. In a storage rack system without storage rack vibration isolators, the energy imparted on the storage rack system during an earthquake is transmitted directly to the storage rack system. Because this energy is not dissipated, the storage rack system without storage rack vibration isolators suffers significant damage. However, in a storage rack system equipped with storage rack vibration isolators, a significant portion of this energy is used to make the storage rack system move. Therefore the ability of the storage rack systems to move serves as a significant energy dissipation factor during seismic events.

Referring to FIGS. 1-4, a storage rack vibration isolator 20*a* comprises a first mounting plate 22*a*, a second mounting plate 24*a* and an elastomeric component. In the embodiment depicted in FIGS. 1-4, the elastomeric component comprises one elastomeric member 26*a* that extends between the first and second mounting plates 22*a* and 24*a*. The elastomeric component is operatively attached to the first and second mounting plates 22*a* and 24*a* such that during seismic events the first and second mounting plates 22*a* and 24*a* remain attached to the elastomeric component while the first and second mounting plates 22*a* and 24*a* are able to move in planes substantially parallel to each other while placing the elastomeric components in shear. The elastomeric member made of material that is capable of absorbing and dissipating the energy of ground movement imparted to the storage rack system during seismic events so as to lower the natural frequency of the storage rack system in at least one horizontal direction. For example, the elastomeric member 26*a* can be constructed from polyisoprene, polyisoprene blend, butyl rubber, acryl rubber, polyurethane, flurorubber, polysulfide rubber, ethylene-propylene rubber (EPR and EPDM), Hypalon, chlorinated polyethylene, ethylene-vinyl acetate rubber, epichlorohydrin rubber, chloroprene rubber, silicone, or other heavily damped elastomer such as those manufactured by Corry Rubber Corporation of Corry, Pa. The elastomeric member 26*a* can also be constructed out of any elastomeric material that will withstand the loading on the storage rack system and has the desired stiffness characteristics as set forth below.

The first and second mounting plates 22*a* and 24*a* can be made out of any metal or nonmetal material that will withstand the loading and forces to which it will be subjected as a component of the storage rack vibration isolator 20*a*. In one embodiment, the first and second mounting plates 22*a* and 24*a* are stamped out of steel plate, the first mounting plate 22*a* being stamped to include semicircular plate spaces 27*a* at two ends. Similarly, the elastomeric member 26*a* also includes semicircular member spaces 29*a* at two ends.

Relative thicknesses of the first mounting plate 22*a*, elastomeric member 26*a*, and second mounting plate 24*a* may depend on specific requirements of an application of the storage rack vibration isolator 20*a*. For example, ⅛ inch-thick first mounting plates 22*a* can be implemented with a ½ inch-thick elastomeric member 26*a* and ⅜ inch-thick second mounting plate 26a. It will be appreciated that other thicknesses are possible and within the contemplated scope of the invention.

An adhesive material is placed between the first mounting plate 22a and elastomeric member 26a and between the elastomeric member 26a and second mounting plate 24a. The adhesive material forms a substantial bond that is sufficient to prevent the first and second mounting plates 22a and 24a from losing contact with the elastomeric member 26a, even when the storage rack vibration isolator 20a is subjected to substantial external forces. Appropriate adhesives include Chemlok® 8560F, Chemlok® 8210/8560S, and Chemlok® 236A, all manufactured by Lord Corporation, or other adhesive substances that are suited to providing such substantial bonds between elastomers and rigid materials.

Figure 2:
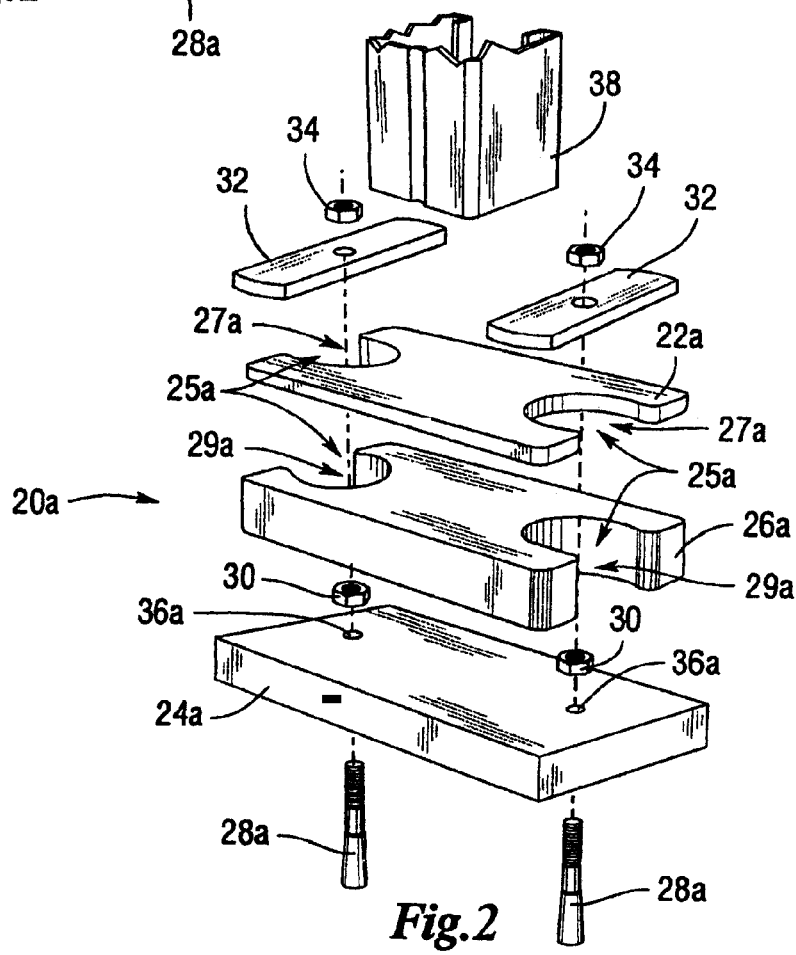
FIG. 2 is an exploded view of the storage rack vibration isolator of FIG. 1.
Figure 3:
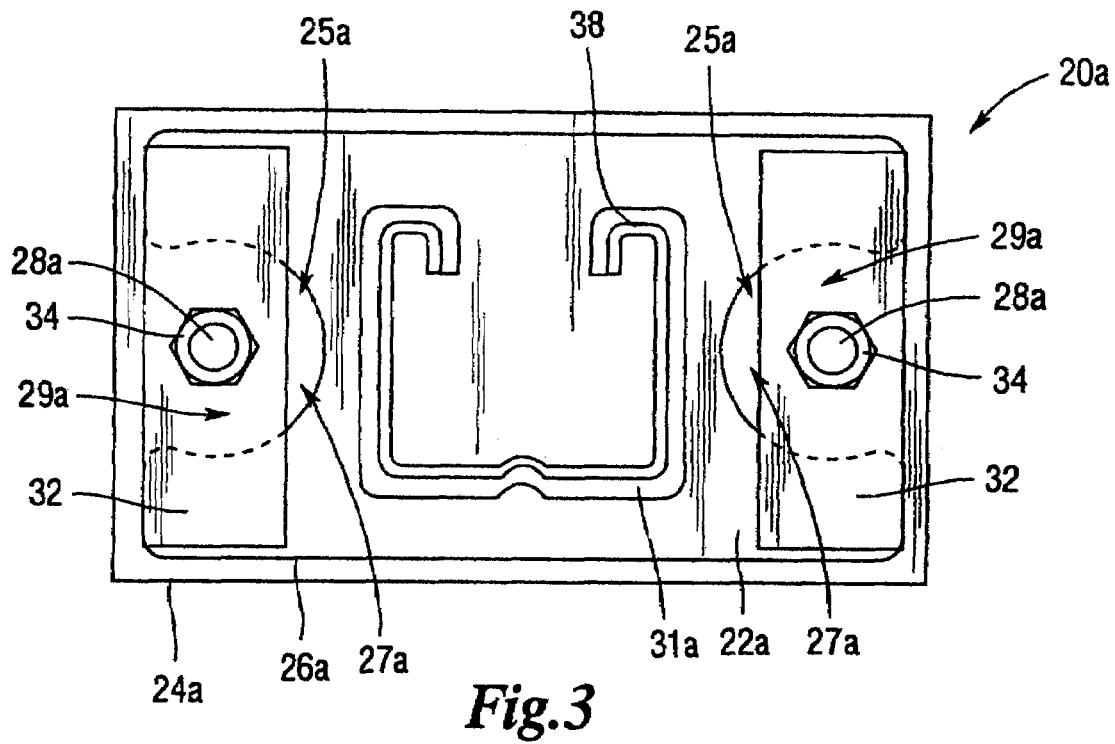
FIG. 3 is a top view of the storage rack vibration isolator of FIG. 1.
Figure 4:
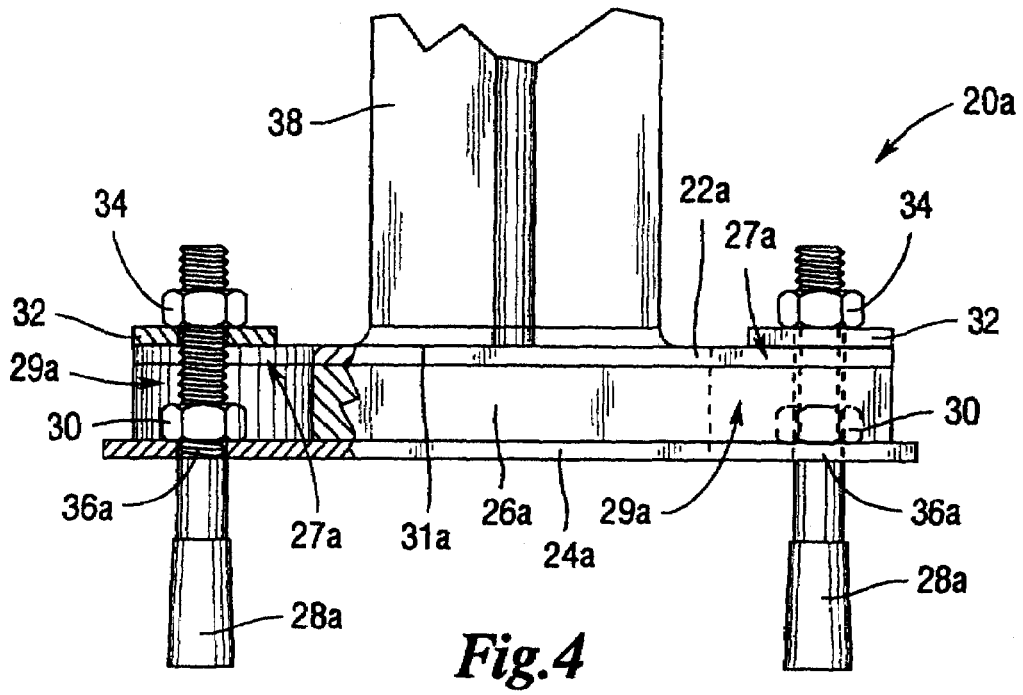
FIG. 4 is a front and partial cross sectional view of the storage rack vibration isolator of FIG. 1.

As best understood by comparing FIG. 1 with FIG. 2, the semicircular plate spaces 27a of the first mounting plate 22a and semicircular member spaces 29a of the elastomeric member 26a are in approximate alignment when the first mounting plate 22a is adhesively bonded to the elastomeric member 26a. The combined semicircular plate spaces 27a and semicircular member spaces 29a create bolt spaces 25a at two ends of the storage rack vibration isolator 20a. The respective configurations of the bolt spaces 25a can be further understood by comparing the top view of the storage rack vibration isolator 20a in FIG. 3 with its side, partial cross sectional view of FIG. 4.

The storage rack vibration isolator 20a also includes a pair of anchor bolts 28a, a pair of base nuts 30 that are adjacent to the second mounting plate 24a when they are installed on the anchor bolts 28a, a pair of rectangular washers 32 and a pair of washer nuts 34 that are adjacent to the upper side of the washers 32 when they are installed on the anchor bolts 28a. The washer nuts 34 hold the washers 32 in place against the first mounting plate 22a. The lower portions of the anchor bolts 28a should be formed in such a manner that they are held firmly by the flooring material on which the storage rack system using the storage rack vibration isolator 20a is installed. The anchor bolts 28a shown in FIGS. 1-4 are constructed to be installed and held firmly in a pad of concrete. In this embodiment, the unthreaded end of each of the anchor bolts 28a is tapered inwardly toward the center of the anchor bolt to increase resistance to the anchor bolt's removal from a concrete floor. The threaded portions of anchor bolts 28a fit through the holes 36a in the second mounting plate 24a.

The anchor bolts 28a do not directly contact the first mounting plate 22a or elastomeric member 26a, but instead extend from the second mounting plate 24a through the bolt spaces 25a to the washers 32. The bolt spaces 25a are generally sufficiently large to prevent the anchor bolts 28a from significantly interfering with movement of the first mounting plate 22a and/or elastomeric member 26a during a seismic event. The bolt spaces 25a are also generally sufficiently large to allow for the use of a wrench or other tool for the tightening or loosening of the base nuts 30.

First and second mounting plates 22a and 24a can be assembled together before the storage rack vibration isolator 20a is shipped to the location where the storage rack system with which it is used is to be installed. This invention is not limited to storage rack vibration isolators manufactured by one process or manufactured using any particular material. However, the polyisoprene, polyisoprene blend, butyl rubber, acryl rubber, polyurethane, flurorubber, polysulfide rubber, ethylene-propylene rubber (EPR and EPDM), Hypalon, chlorinated polyethylene, ethylene-vinyl acetate rubber, epichlorohydrin rubber, chloroprene rubber, silicone, or other material of the elastomeric member 26a of the storage rack vibration isolators 20a can be manufactured by mixing a batch of raw materials, in a manner well known to those skilled in the art, required to produce rubber having the physical characteristics, such as various types of stiffness and dampening, desired for use in the storage rack vibration isolator 20a. When the batch is mixed, it can be removed from the mixer, dropped into a mill, blended and sheeted off in a size that is appropriate for feeding an injection molding machine. After the batch is cooled and tested to ensure it has the required stiffness and dampening characteristics, it can then be loaded into an injection molding machine. The washers 32 can be metal stampings that are treated with zinc phosphate or other corrosion resistant coatings.

When the adhesive materials are applied between the first mounting plate 22a and elastomeric member 26a and between the elastomeric member 26a and second mounting plate 24a, Chemlok® 8007, manufactured by Lord Corporation, can be applied followed by a coat of Chemlok® 8560S. Many other adhesives manufactured by Lord Corporation or other companies can be used as alternatives for this illustrated manufacturing process.

The metal washers 32 can be loaded into a mold form in an injection molding machine. The rubber that had been loaded into this machine can then be injected into the mold, and the resulting sandwich of plates 22a and 24a rubber elastomer 26a can then be cured. Typically, this assembly is subsequently removed from the mold and trimmed.

The bottom end of a storage rack column 38 is welded to the first mounting plate 22a at weld 31a. The elastomeric layer 26a and adhesives bonding the elastomeric layer 26a to the first mounting plate 22a and second mounting plate 24a are capable of withstanding heat stresses from the welding of column to the first mounting plate 22a. It has been found that such heat stress resistance is present where polyisoprene, polyisoprene blend, or butyl rubber have been used to form the elastomeric layer 26a. These materials have also been found to resist the type of compression, bumping, and lateral stresses that are encountered when the column is placed on and then attached to the first mounting plate 22a.

The threaded ends of anchor bolts 28a are placed through the holes 36a of the second mounting plate or plate 24a, and the base nuts 30 are tightened against the second mounting plate 24a so as to hold the second mounting plate 24a tightly against the floor in which the bottoms of anchor bolts 28a have been embedded. The rectangular washers 32 are placed over the tops of anchor bolts 28a and the washer nuts 34 are tightened against the upper ends of the washers 32. This causes the rectangular washers 32 to apply a downward force against first mounting plate 22a, the elastomeric member 26a and second mounting plate 24a. The weight of the storage rack system and articles or material stored on the storage racks and coupled through the column 38 further loads the storage rack vibration isolator 20a.

Referring to FIGS. 1 through 4, when a seismic event such as an earthquake occurs, the earth moves and sets up vibrations in multiple directions. This movement also imparts an acceleration that the storage rack system tries to match. If the columns of the storage rack were fixed to the floor, this acceleration could significantly damage the structural components of the storage rack system. In addition, items stored on the storage rack shelves could fall off the racks. The storage rack vibration isolators 20a are able to absorb and dissipate some of the forces that the storage rack system experiences during seismic events. Since the bottoms of anchor bolts 28a are held firmly within the concrete floor in which they are embedded, and the base nuts 30 fasten the second mounting plate 24a against the floor, the second mounting plate 24a vibrates laterally with the floor during seismic events. The acceleration due to this lateral movement is transmitted through the storage rack vibration isolators 20a and causes the storage rack system to move with the elastomeric component. This movement, or compliance, of the elastomeric component increases the overall flexibility of the storage rack system and serves to dissipate the energy imparted to the storage rack system from the seismic event. In addition the elastomeric component also dampens vibrations imparted to the storage rack system from ground movement during the earthquake. The storage rack vibration isolators 20a reduce the natural frequency of the storage rack system such that the storage rack system is better able to withstand seismic events.

While any reduction in the natural frequency of the storage rack system will provide some protection against seismic events, the goal is to reduce the natural frequency of the storage rack system such that damage to the storage racks is reduced and product stored on the storage racks does not fall off. It is preferable to reduce the natural frequency of the storage rack system to less than about 0.9 Hz, or ideally to less than about 0.5 Hz. Storage rack vibration isolators are selected that can achieve such frequencies depending on the target natural frequency to be achieved and the expected maximum load on the storage rack system. Both these parameters can be accounted for by selecting the static and dynamic modulus, or stiffness, of the elastomeric material used in the elastomeric component.

The static stiffness of an elastomeric material can be measured by several factors, including the compression stiffness, $K_{compression}$ and the shear stiffness $K_{shear}$. The compression stiffness is a measure of the force required to deflect an elastomer such as a block of rubber a vertical distance, and is measured in pounds per inch, while the shear stiffness $K_{shear}$ is a measure of the amount of force required to deflect a block of rubber a particular lateral distance, measured in pounds per inch.

Among the dynamic characteristics that make elastomeric materials useful for absorbing energy during seismic events is the fact that such materials have elastic and inelastic components that cause force and displacement to be out of phase, allowing for energy dissipation or "damping" to occur. The dynamic characteristics of an elastomeric mount include damping stiffness K", representing inelastic stiffness as reflected in the "lag time" between a displacement and a subsequent force exerted by the material, and elastic stiffness K', representing the stiffness that is in phase with a displacement of the material. Damping stiffness K" and elastic stiffness K' are both measured in pounds per inch. The damping loss factor of a particular rubber is the ratio of its damping stiffness divided by its elastic stiffness, $$L_{dif} = K''/K'$$

A dynamic test machine is used to dynamically load an elastomeric material and measure the extent to which the spring response of the material is dampened by the material's physical characteristics. Rubber or another elastomeric material should have a damping loss factor greater than about 0.1, i.e.

$$K''/K' > 0.1$$

The energy dissipated by an elastomeric material per cycle of vibration is equal to:

$$\pi K'' x^2$$

where K" is the dampening stiffness and x is the peak-to-peak distance of movement of the ends of the elastomeric material during a vibration, that is, the total distance of a vibration in both directions. Thus, the energy dissipated per cycle of vibration increases with the square of the increase of the peak-to-peak distance of the movement between the ends of the vibrating elastomeric material. Additionally, the material frequency of the rack system decreases as the increased distance of movement between the ends of the elastomeric material increases the distance the lower ends of the rack columns move per cycle of vibration. It was determined that the lower ends of rack columns should be allowed to move at least about two inches and preferably more than about four inches, in each direction from their resting position during each cycle of seismic vibration.

The stiffness parameters discussed above are also related to the hardness of the elastomer, measured in durometer. The higher the durometer value of a particular elastomer the stiffer it is.

Polyisoprene, polyisoprene blend, silicone, acryl rubber, polyurethane, flurorubber, polysulfide rubber, ethylene-propylene rubber (EPR and EPDM), Hypalon, chlorinated polyethylene, ethylene-vinyl acetate rubber, epichlorohydrin rubber, chloroprene rubber, and butyl rubber are among the materials that have been determined to meet these general requirements for being suitably implemented in the elastomeric member. However, it will be appreciated that other materials that generally meet these requirements may also be suitable and are contemplated to be within the scope of the invention.

It will also be appreciated that variations in the configuration of the first or second mounting plates or the elastomeric member are possible and within the contemplated scope of the invention. For example, FIG. 5 depicts a storage rack vibration isolator 20b in which the elastomeric component includes an elastomeric member 26b with a top recessed surface 39 and a booted edge 40. A first mounting plate 22b is sized to fit within the booted edge 40 and be adhesively attached to the top recessed surface 39 of the first mounting plate 22b when the storage rack vibration isolator 20b is assembled. Thus, the major surface footprint of the first mounting plate 22b should be sized slightly smaller than the footprint of the elastomeric member 26b to allow for accommodation within the booted edge 40. The semicircular member spaces 29b of the elastomeric member 26b must also be increased in their vertical dimensions to allow the ends of the semicircular plate spaces 27b of the first mounting plate 22b to become enclosed by the booted edge 40 upon assembly.

In some embodiments, the semicircular plate spaces of the first mounting plate and/or elastomeric member can be replaced with other suitable space configurations that create bolt spaces allowing for relative movement between the bolts and plates so that the elastomeric member can be placed in shear to absorb and dissipate the energy of movement during a seismic event. The semicircular plate spaces also create room to allow for the use of a wrench to adjust the base nuts. FIG. 6 depicts a storage rack vibration isolator 20c in which the semicircular plate spaces depicted in the previous embodiments are replaced with enlarged bolt accommodation holes 42. The bolt accommodation holes 42 are combined with the semicircular member spaces 29c of the elastomeric members 26c to form bolt spaces 25c that are sized to be significantly larger than the thickness of the individual anchor bolts 28c to allow movement of the bolts 28c. Although FIG. 6 only shows replacement of the semicircular plate spaces with bolt accommodation holes 42, it will be appreciated that in some embodiments, the semicircular member spaces 29c can also be replaced with similar hole-like accommodation configurations. Such accommodation configurations would also be added to the combined bolt spaces of the first mounting plate and elastomeric member.

Figure 7:
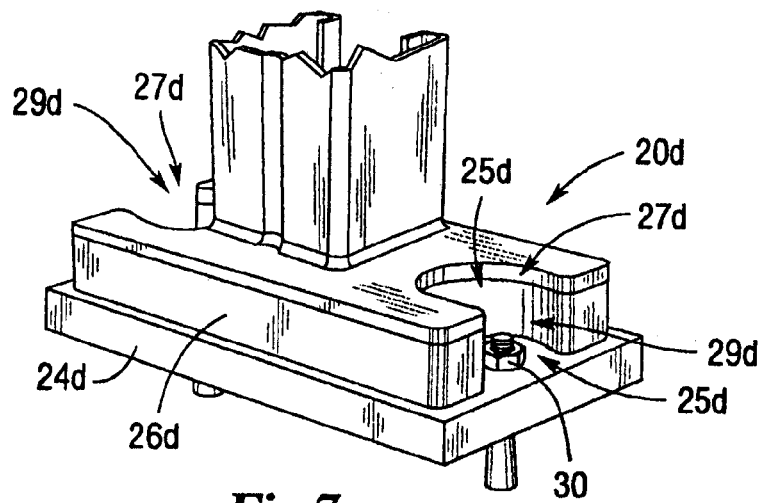
FIG. 7 is a perspective view of a storage rack vibration isolator welded to the bottom of a rack column.
Figure 8:
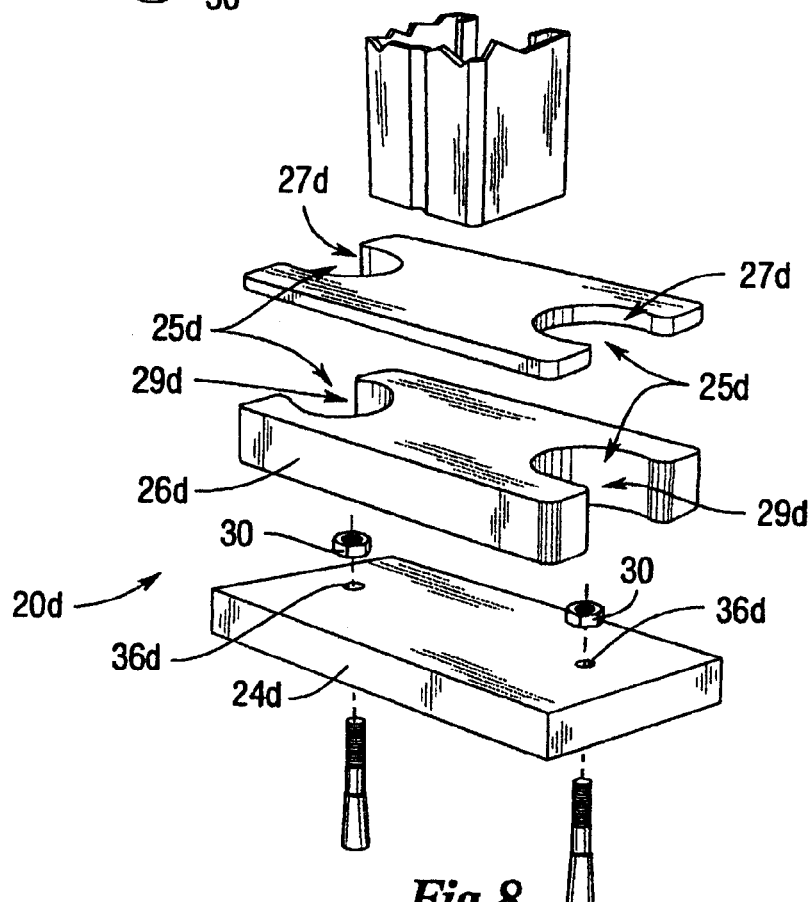
FIG. 8 is an exploded view of the storage rack vibration isolator of FIG. 7.

Although the invention has been shown and described with a first mounting plate and elastomeric component that are further secured to the second mounting plate and concrete floor with rectangular washers attached to extended bolts, it will be appreciated that the inclusion of rectangular washers and/or other clamping mechanisms is generally not necessary and sufficient structural stability can normally be achieved with the use of adhesives alone between the first mounting plate, elastomeric member, and second mounting plate. FIG. 7 depicts an assembled storage rack vibration isolator 20d in which the anchor bolts 28d do not extend above the first mounting plate 22d and in which no rectangular washers or other clamping mechanisms are present. An exploded view of the storage rack vibration isolator 20d of FIG. 7 is shown in FIG. 8.

The storage rack vibration isolator 20d relies on adhesives applied between the first mounting plate 22d and the elastomeric component comprised in this embodiment of a single elastomeric member 26d for anchoring and structural stability. Bolts 28d need only extend sufficiently above the second mounting plate 24d to allow for engagement of nuts 30 to secure the second mounting plate 24d to the floor. The semicircular plate spaces 27d of the first mounting plate 22d and the semicircular member spaces 29d of the elastomeric member 26d are included to retain a bolt space 25d that allows for the use of a wrench or other tool for adjusting the base nuts 30.

Figure 9:
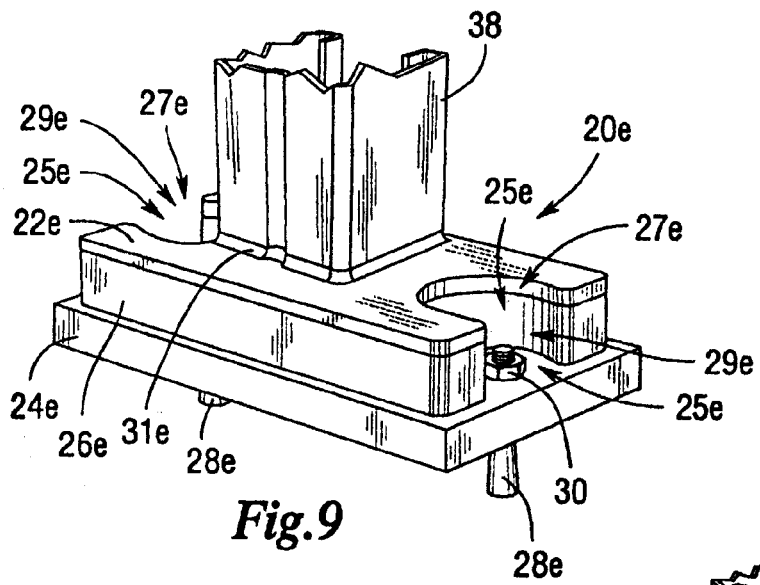
FIG. 9 is a perspective view of a storage rack vibration isolator in which the bottom of a column is welded to a column base that becomes a portion of the vibration isolator.
Figure 10:
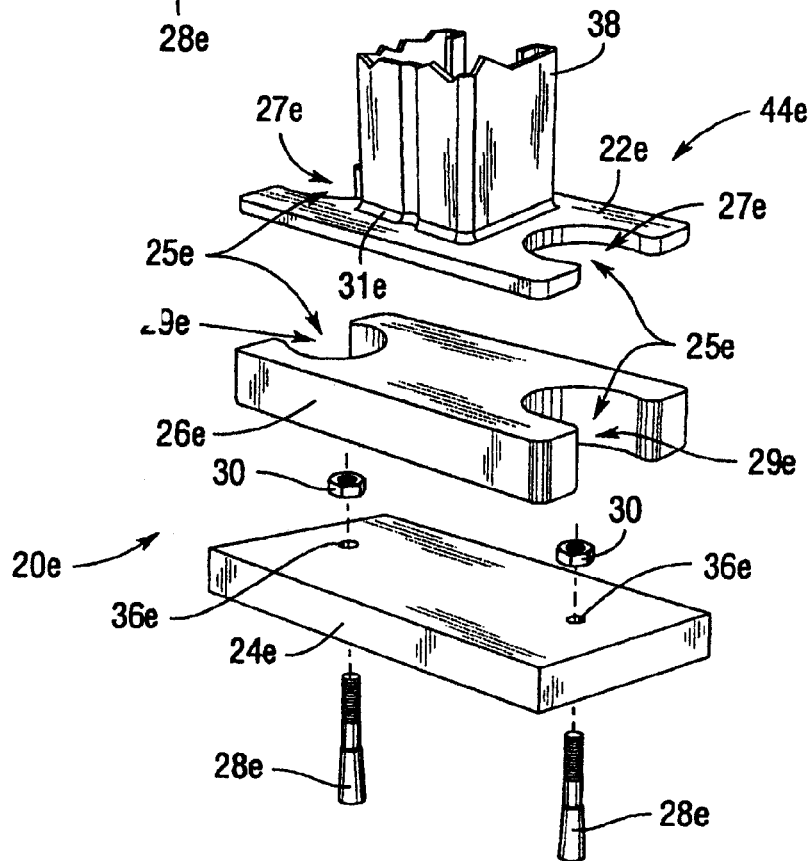
FIG. 10 is an exploded view of the storage rack vibration isolator shown in FIG. 9.

In some applications of the invention, it may not be possible to weld a column to the first mounting plate at the site of assembly or it may be otherwise preferable to attach the column to the first mounting plate prior to assembly. FIG. 9 depicts an assembled storage rack vibration isolator 20e that is similar to the storage rack vibration isolator 20d of FIG. 7. However, FIG. 10, an exploded view of the storage rack vibration isolator 20e of FIG. 9, depicts the column 38 as having been welded to the first mounting plate 22e to form a welded attachment member 44e prior to assembly of the storage rack vibration isolator 20e.

Figure 11:
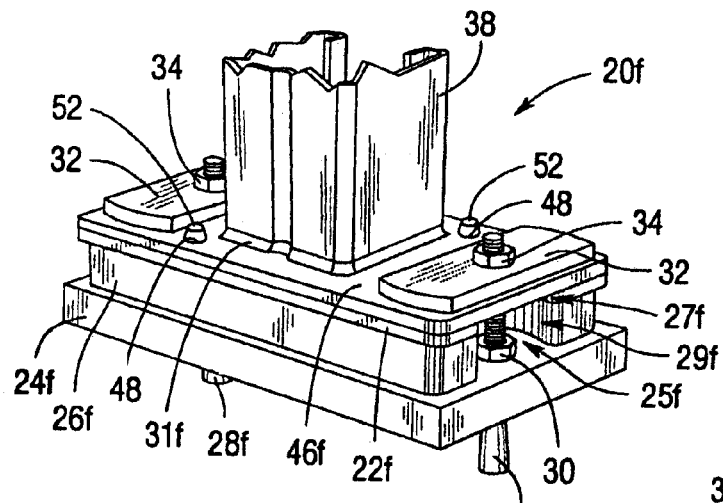
FIG. 11 is a perspective view of a storage rack vibration isolator fastened to a base plate to which the bottom of a rack column is welded.
Figure 12:
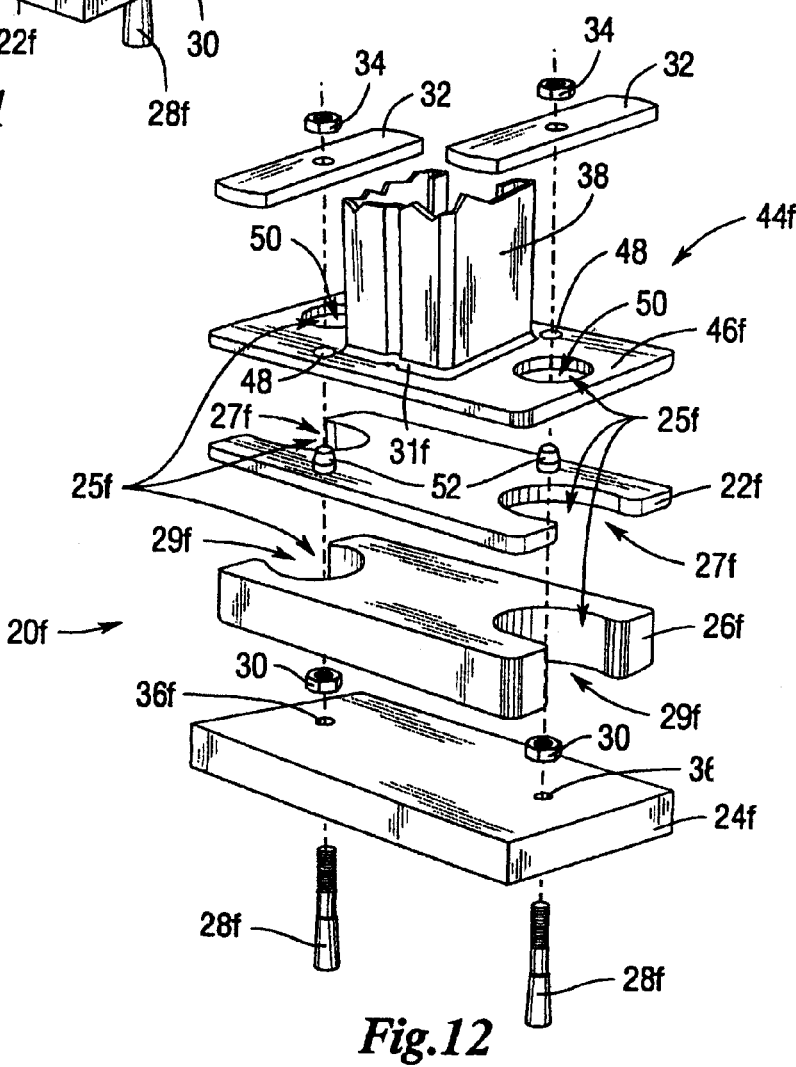
FIG. 12 is an exploded view of a storage rack vibration isolator shown in FIG. 11.

Although the invention has been shown and described with columns of storage racks that are permanently welded to first mounting plates of storage rack vibration isolators, it will be appreciated that some embodiments of the invention may allow for the detachment of columns from otherwise assembled storage rack vibration isolators without requiring detachment of the adhesively connected first mounting plate, elastomeric component, and second mounting plate. FIG. 11 depicts an assembled storage rack vibration isolator 20f having a separate rack base plate 46f welded to a storage rack column 38 to form a welded attachment member 44f. As best understood by comparing FIG. 11 with the exploded view of the storage rack vibration isolator 20f in FIG. 12, a rack base plate 46f includes stud holes 48 and enlarged bolt accommodation holes 50 that all extend through the rack base plate 46f.

The first mounting plate 22f includes multiple studs 52 that extend upward from the top surface of the first mounting plate 22f. The studs 52 can be compression fit and/or welded or otherwise attached to the first mounting plate 22f. As best understood by comparing FIGS. 11 and 12, each stud 52 is aligned to engage the stud holes 48 of the rack base plate 46f when the base plate 46f is positioned on the first mounting plate 22f, with each stud 52 penetrating and extending above the top surface of the base plate 46f when the storage rack vibration isolator 20f is assembled, as depicted in FIG. 11.

The studs 52 preserve the relative alignment of the first mounting plate 22f with the rack base plate 46f when the storage rack vibration isolator 20f is assembled. Although the first mounting plate 22f is adhesively attached to the elastomeric member 26f of the elastomeric component, which is in turn adhesively attached to the second mounting plate 24f, in this illustrated embodiment there is no adhesive attachment of the first mounting plate 22f to the rack base plate 46f. This allows the rack supported by the column 38 to be removed from the storage rack vibration isolator 20f after installation without requiring cutting or destructive detachment of the column 38 from the first mounting plate 22f.

The bolt accommodation holes 50 of the base plate 46f are enlarged to allow for the insertion of the anchor bolts 28f, which are attached to the rectangular washers 32 with washer nuts 34. Like the semicircular plate spaces 27f and semicircular member spaces 29f, the bolt accommodation holes 50 help define the total bolt spaces 25f that allow for the free movement of the anchor bolts 28f and dissipation of energy by the elastomeric member 26f during a seismic event. Although the rack base plate 46f is shown and described with bolt accommodation holes 50, it will be appreciated that semicircular spaces similar to the semicircular plate spaces 27f of the first mounting plate 22f and semicircular member spaces 29f of the elastomeric member 26f could also be used within the contemplated scope of the invention.

When the column 38 is installed on the storage rack vibration isolator 20f, the rectangular washers 32 prevent detachment of the rack base plate 46f from the first mounting plate 22f and thus prevent column 38 and welded attachment member 44f from upward lifting away from the storage rack vibration isolator 20f. The rectangular washers 32 move with the anchor bolts 28f when the anchor bolts 28f move due to the movement of the ground during the seismic event. The washers 32 can be removed by loosening and removing the washer nuts 34, thereby allowing the column 38 to be removed without cutting or damaging the storage rack vibration isolator 20f by lifting the rack base plate 46f away from the first mounting plate 22f.

Figure 13:
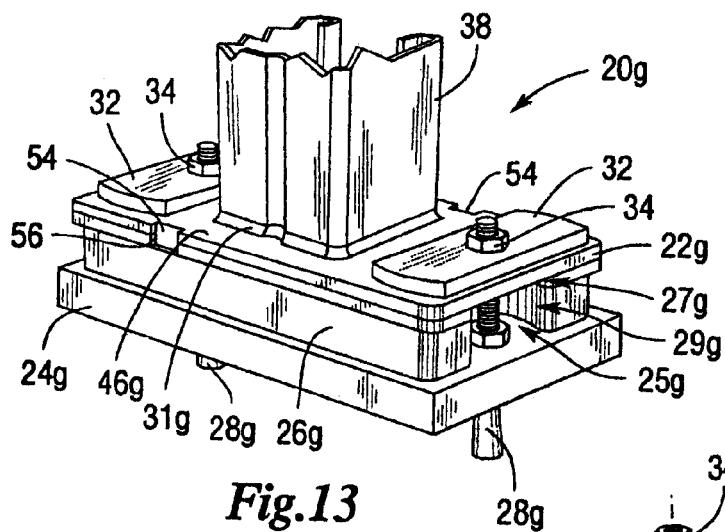
FIG. 13 is a perspective view of another storage rack vibration isolator fastened to a base plate welded to the bottom of a storage rack column.
Figure 14:
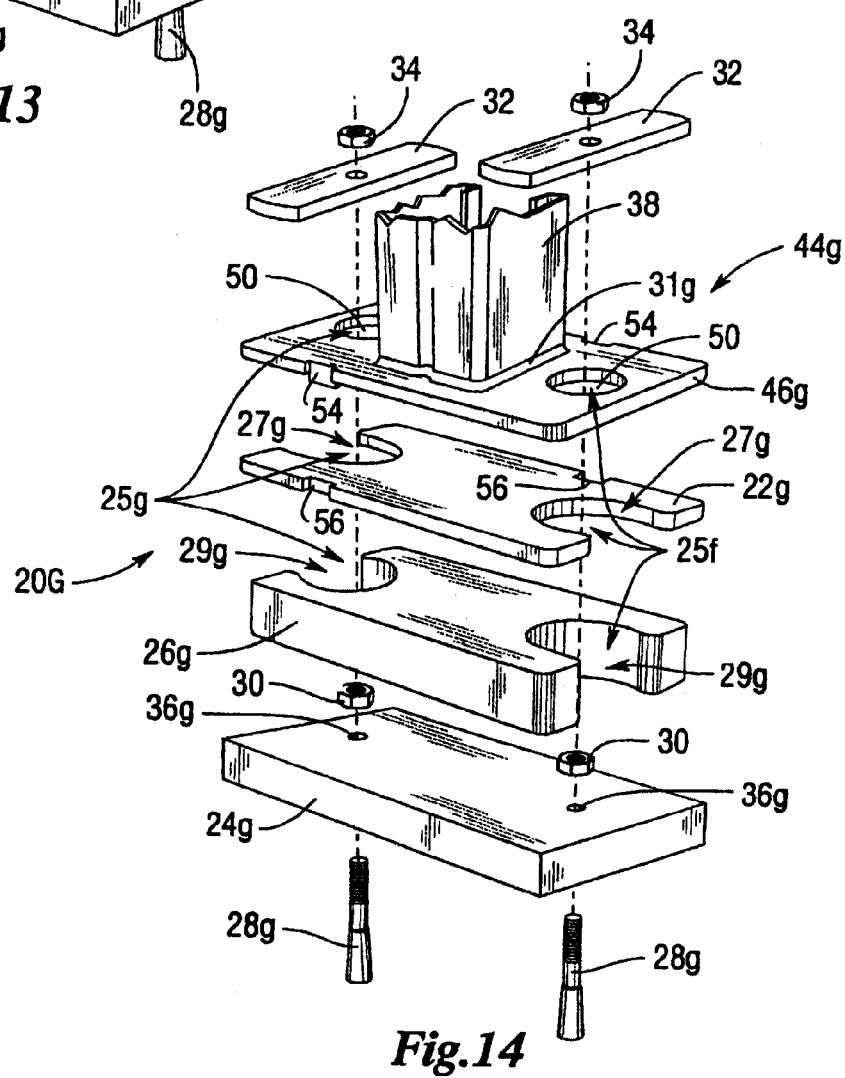
FIG. 14 is an exploded view of the storage rack vibration isolator shown in FIG. 13.

Other configurations allowing for alignment between a first mounting plate and rack base plate are also possible. Referring now to FIG. 13, a storage rack vibration isolator 20g is shown having keys 54 extending downward from the rack base plate 46g. As best understood by comparing FIG. 13 to the exploded view of FIG. 14, the keys 54 can be formed by cutting two parallel slits into the rack base plate 46g for each key 54 and then by bending tabular segments between each pair of slits downward to form the individual keys 54. Key notches 56 are cut into the first mounting plate 22g and are sized to engage the keys 54 and align the rack base plate 46g with the first mounting plate 22g when positioned thereon without restricting movement of the rack base plate 46g in the upward direction. The keys 54 and key notches 56 therefore allow the column 38 and rack base plate 46g, which together comprise the welded attachment member 44g, to be removed by upward lifting from the first mounting plate 22g without requiring cutting or damaging of the storage rack vibration isolator 20g when the washer nuts 34 and rectangular washers 32 are removed.

Figure 15:
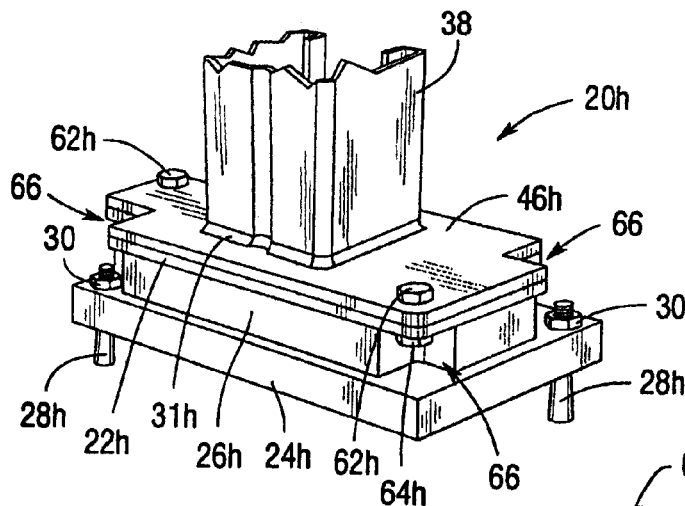
FIG. 15 is a perspective view of another storage rack vibration isolator fastened to a base plate welded to the bottom of a storage rack column.
Figure 16:
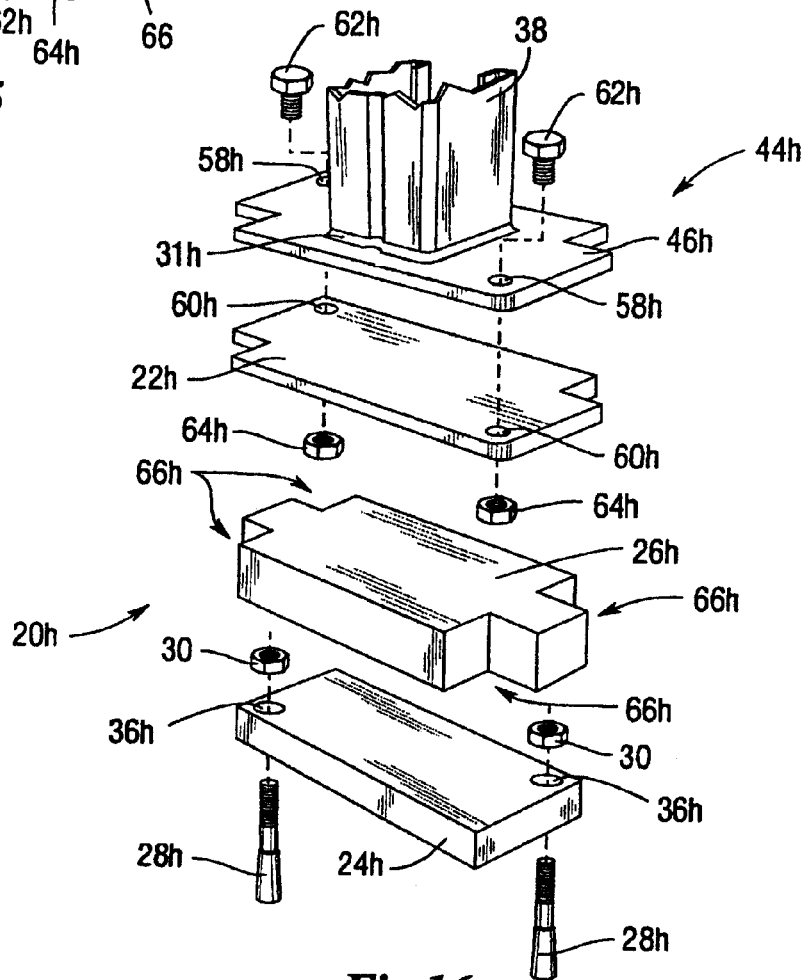
FIG. 16 is an exploded view of the storage rack vibration isolator shown in FIG. 15.

It will also be appreciated that some embodiments can allow for the removal and attachment of a column and/or a welded attachment member without the use of washers and washer nuts. For example, a storage rack vibration isolator $20h$ is depicted assembled in FIG. 15 and in an exploded view in FIG. 16 that includes a welded attachment member $44h$ in which the rack base plate $46h$ includes base plate holes $58h$ at two corners that are aligned with mounting plate holes $60h$ of the first mounting plate $22h$ when assembled. The base plate holes $58h$ and mounting plate holes $60h$ are sized to accommodate plate screws $62h$ which provide attachment between the base plate $46h$ and first mounting plate $22h$ and which can be tightened into position with plate nuts $64h$.

The plate screws $62h$ and plate nuts $64h$ allow the rack base plate $46h$ to be detached from the first mounting plate $22h$ without requiring cutting or damage to the storage rack vibration isolator $20h$. In this embodiment the elastomeric component comprises a single elastomeric member $26h$. Attachment of the first mounting plate $22h$ to the elastomeric member $26h$ and the elastomeric member $26h$ to the second mounting plate $24h$ is dependent on the adhesives placed therebetween. Anchor bolts $28h$ and base nuts $30$ are located at two corners of the second mounting plate $24h$. The elastomeric member $26h$ includes four access notches $66h$ to accommodate a wrench or similar tool for adjustment of the base nuts $30$ and plate nuts $64h$.

Figure 17:
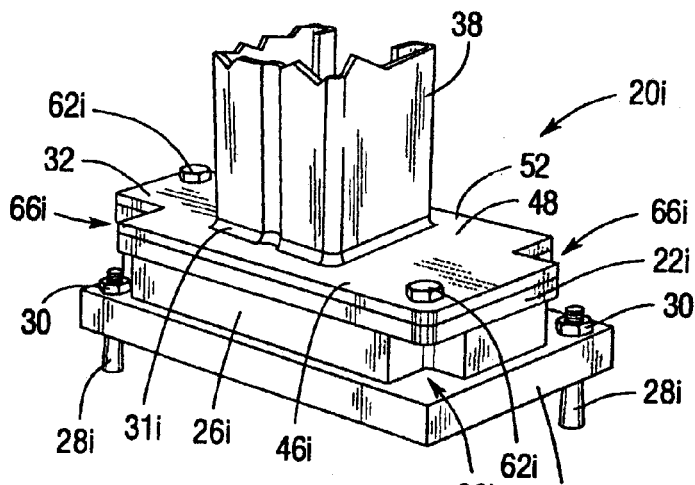
FIG. 17 is a perspective view of another storage rack vibration isolator fastened to a base plate welded to the bottom of a storage rack column.
Figure 18:
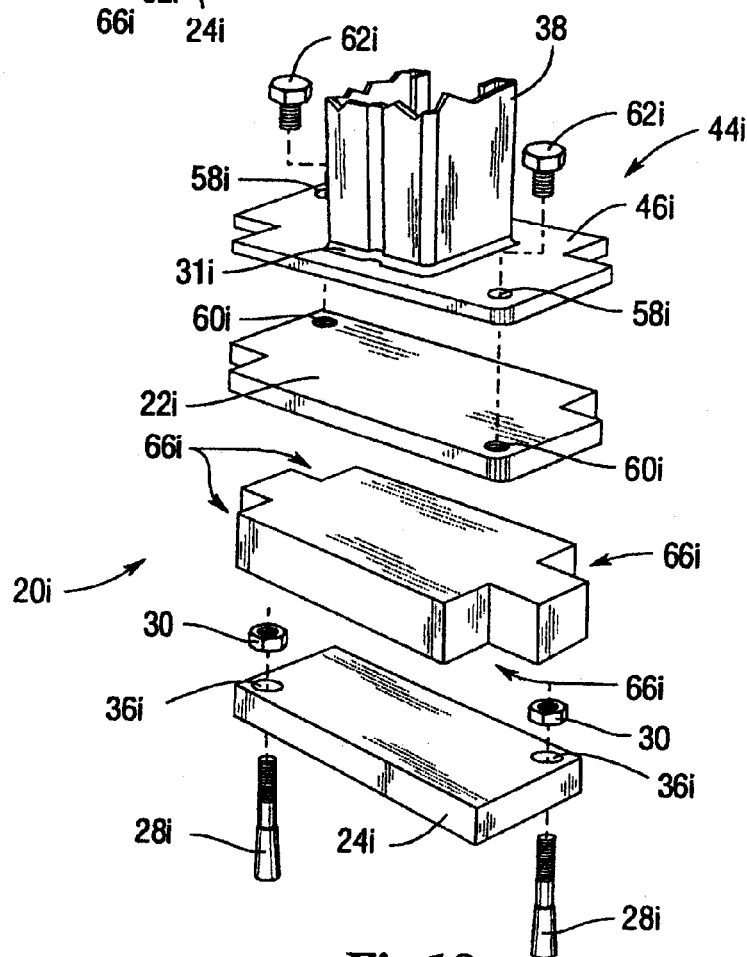
FIG. 18 is an exploded view of the storage rack vibration isolator shown in FIG. 17.

The use of threaded members can eliminate the need for nuts in some embodiments and further facilitate detachment of the column and rack base plate from the storage rack vibration isolator. FIG. 17 depicts an assembled storage rack vibration isolator $20i$ in which the first mounting plate $22i$ includes mounting plate holes $60i$ that are female threaded, as best understood by comparing FIG. 17 with the exploded view of the storage rack vibration isolator $20i$ in FIG. 18. When the storage rack vibration isolator $20i$ is assembled, plate screws $62i$ having male threads extend through the base plate holes $58i$ of the rack base plate $46i$ to engage the female threads of the mounting plate holes $60i$ to secure the rack base plate $46i$ to the first mounting plate $60i$. The female threads of the mounting plate holes $60i$ will generally have a sufficient number of turns to sufficiently engage the plate screws $62i$ without the need for additional hardware, further simplifying installation and removal. A sufficient number of turns is generally present when the first mounting plate $60i$ is constructed from ¼ inch-thick plate material. Such sizing can also generally allow the plate screws $62i$ to be sized to bottom out within the first mounting plate $60i$, hiding the male threads of the screws $62i$ entirely within the first mounting plate $60i$.

Figure 19:
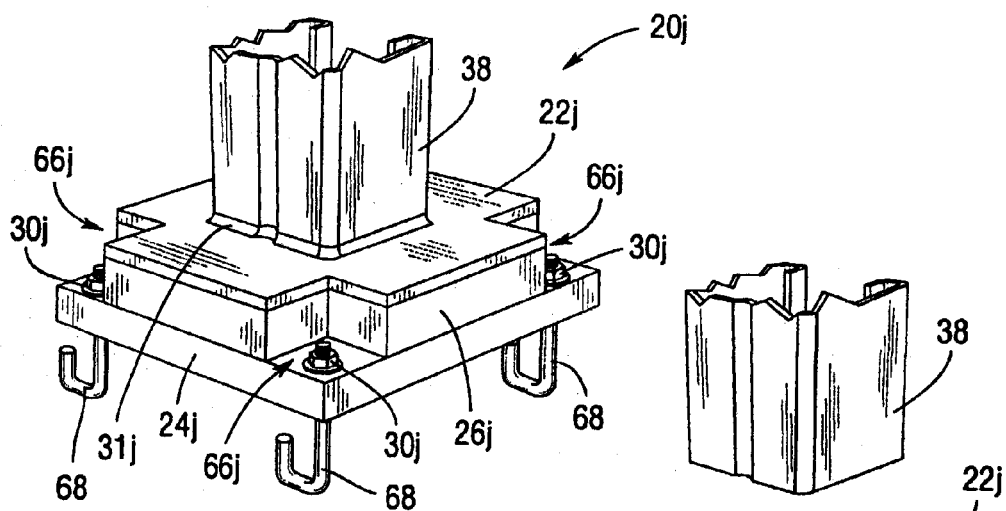
FIG. 19 is a perspective view of another storage rack vibration isolator fastened to a base plate welded to the bottom of a storage rack column.
Figure 20:
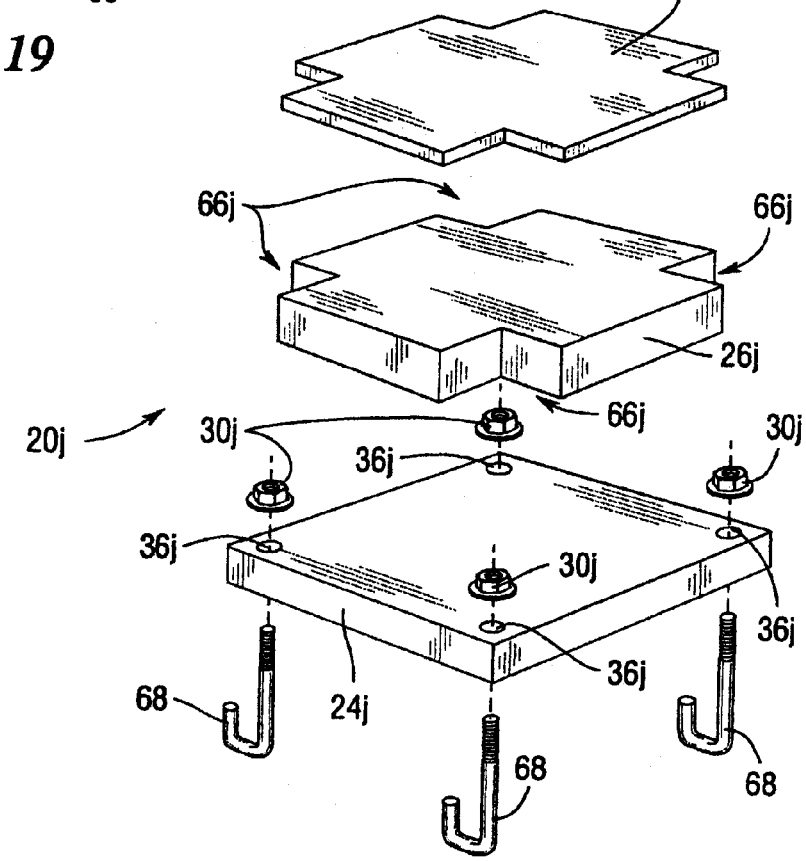
FIG. 20 is an exploded view of the storage rack vibration isolator shown in FIG. 19.

Variations in the anchoring to the ground are also within the intended scope of the invention. A few of the many possible variations are described below and shown in the drawings. FIGS. 19 and 20 depict assembled and exploded views of a storage rack vibration isolator $20j$ that is anchored to the floor with j-bolts $68$. The j-bolts $68$ can be cast in place in concrete and shaped to hook to the concrete or can be hooked to other structures beneath the ground level of the second mounting plate $24j$. The j-bolts $68$ include threaded ends that can extend through holes $36j$ to engage base nuts $30j$ for securing the storage rack vibration isolator $20j$ to the ground. Access notches $66j$ in the elastomeric member $26j$ allow for the accommodation of a wrench or other tool for tightening the j-hooks against the second mounting plate $24j$.

Figure 21:
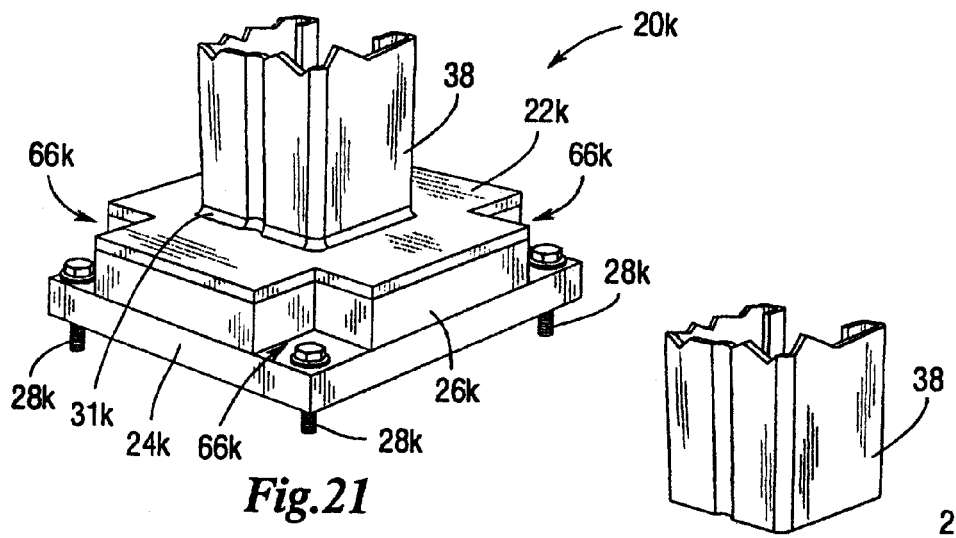
FIG. 21 is a perspective view of another storage rack vibration isolator fastened to a base plate welded to the bottom of a storage rack column.
Figure 22:
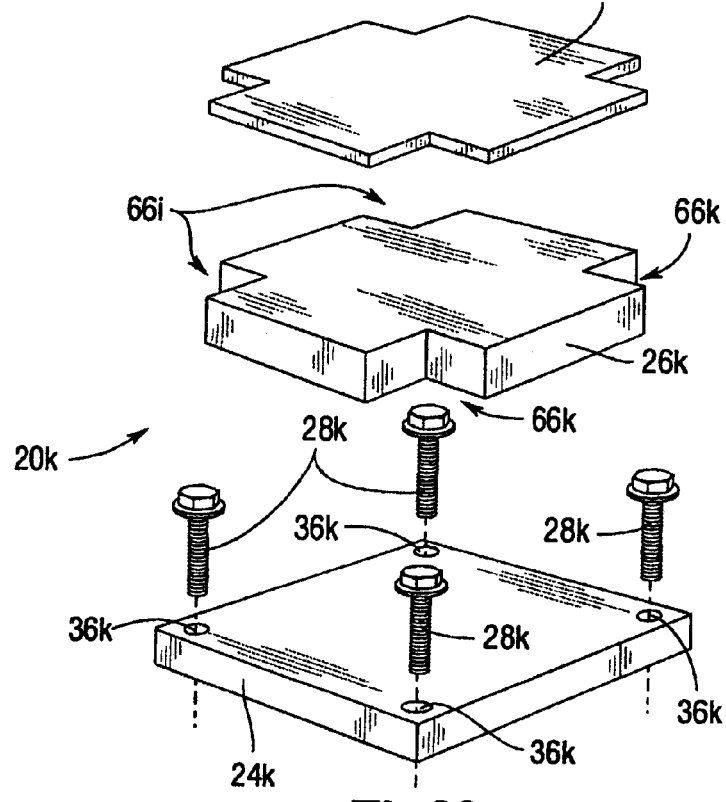
FIG. 22 is an exploded view of the storage rack vibration isolator shown in FIG. 21.

FIGS. 21 and 22 depict assembled and exploded views of a storage rack vibration isolator $20k$ that is anchored to a floor with anchor bolts $28k$ that are threaded to allow male threads to be inserted through holes $36k$ of the second mounting plate $24k$ to create female threads in a floor or ground member (not shown) on which the second mounting plate $24k$ is supported. The access notches $66k$ of the elastomeric member $26j$ allow for the accommodation of a wrench or other tool which tightens the anchor bolts $28k$ against the second mounting plate $24k$ to secure the storage rack vibration isolator $20k$ to the ground.

Figure 23:
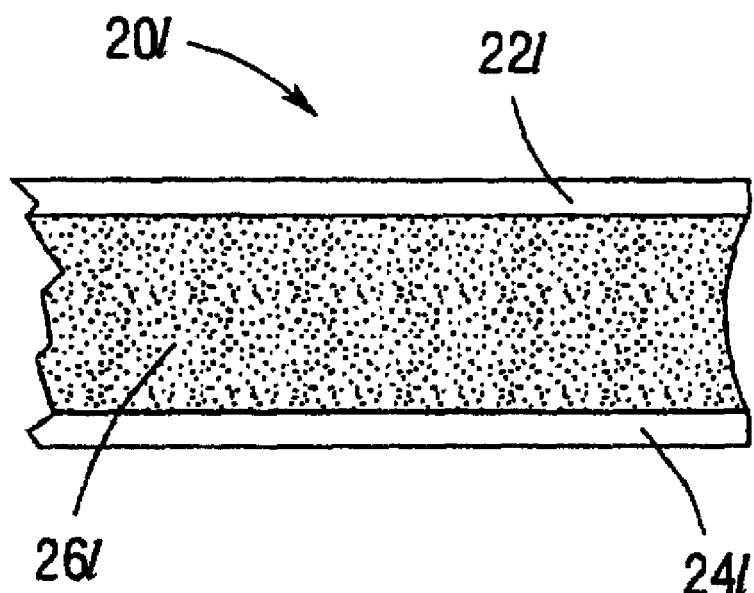
FIG. 23 is a partial side view of a structure that can be used to construct storage rack vibrators.

It will be further appreciated that variations in the cross sectional geometry of the mounting plates and elastomeric member or members are also contemplated within the intended invention scope. For example, FIG. 23 depicts a cross sectional view of a storage rack vibration isolator $20l$ having an elastomeric component with an elastomeric member $26l$ having an increased thickness. For purpose of comparison, the elastomeric member $26l$ is shown with an increased cross sectional thickness with respect to the cross sectional thicknesses of the first mounting plate $22l$ and second mounting plate $24l$. Shear stiffness is inversely proportional to the thickness of the elastomeric member $26l$. Although compression stiffness is not linearly related to the thickness of the elastomeric member $26l$, an increase in the thickness of the elastomeric member $26l$ as shown allows for reductions in both the shear stiffness and compression stiffness of the elastomeric member $26l$ where such reductions are desired.

Figure 24:
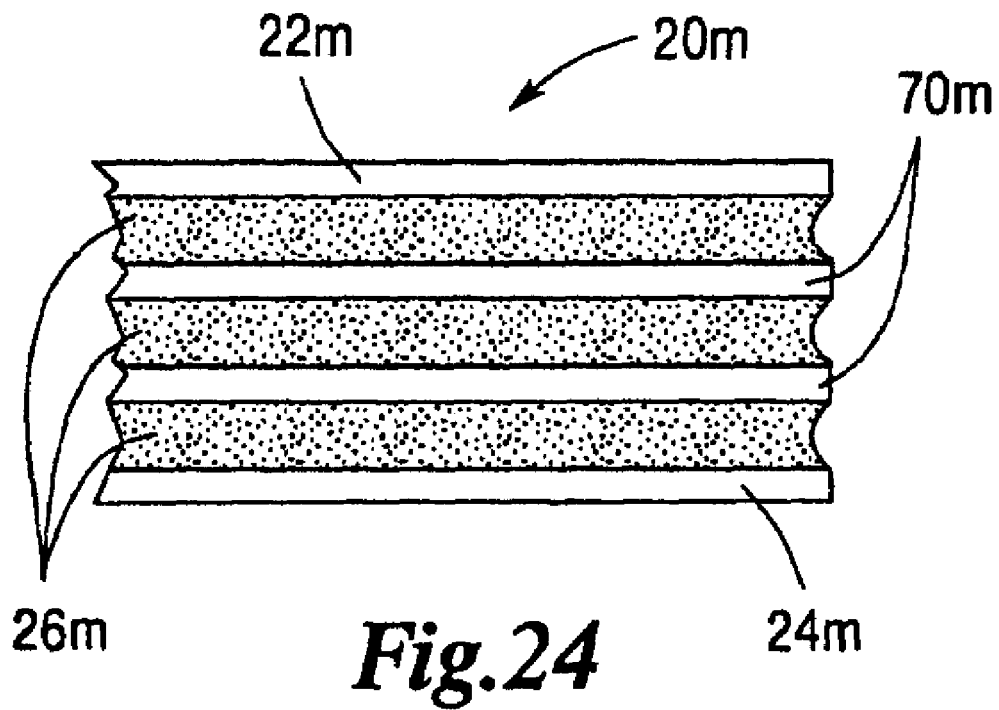
FIG. 24 is a partial side view of a structure that can be used to construct storage rack vibration isolators.

In some applications, it may be desirable to reduce shear stiffness without creating a substantial reduction in compression thickness. FIG. 24 depicts a storage rack vibration isolator $20m$ having an elastomeric component with two intermediate plates $70m$ that are positioned between laminated elastomeric layers $26m$, the combined intermediate plates $70m$ and laminated elastomeric layers $26m$ being positioned between the first mounting plate $22m$ and second mounting plate $24m$. An appropriate adhesive material bonds each plate $22m$, $24m$, or $70m$ to its adjacent laminated elastomeric layer(s) $26m$. The intermediate plates $70m$ may be rigid or nonrigid.

Assume that each of the three divided elastomeric layers $26m$ of the elastomeric component of the storage rack vibration isolator $20m$ of FIG. 24 is one-third the thickness of the single elastomeric layer $20l$ of FIG. 23. Since the total shear stiffness is inversely proportional to the total combined thicknesses of the divided elastomeric layers $26m$, the total shear stiffness of the storage rack vibration isolator $20m$ of FIG. 24 is approximately the same as the total shear stiffness of the storage rack vibration isolator $20l$ of FIG. 23. However, as noted above, compression stiffness is not linearly related to the total thickness of the elastomeric layers $26m$. The divided elastomeric layers $26m$ and the placement of intermediate plates $70m$ therebetween cause the storage rack vibration isolator $20m$ of FIG. 24 to be almost significantly stiffer in the compressive direction than the storage rack vibration isolator $20l$ of FIG. 23.

A storage rack vibration isolator $20n$ having an elastomeric component with multiple laminated elastomeric layers $26n$ is depicted in FIG. 25 with an exploded view being depicted in FIG. 26. Referring to FIGS. 25 and 26, an intermediate plate $70n$ is positioned between the elastomeric layers $26n$ and secured in place with an adhesive. It is contemplated that the adhesive between the elastomeric layers $26n$ and the first mounting plate $22n$, intermediate plate $70n$, and second mounting plate $24n$ would be alone sufficient for adequate bonding therebetween, though washers such as the rectangular washers $32$ with extended bolts $28n$ as shown in FIG. 1 or other such additional clamping mechanisms could also be added.

Intermediate plate spaces $71$ at each end of the intermediate plate $70n$ align with the semicircular member spaces 29*n* and semicircular plate spaces 27*n* to form the bolt spaces 25*n* allowing access to the base nuts 30. One embodiment of the isolator 20*n* would incorporate two approximately ½" thick elastomeric layers 26*n* separated by one approximately 1/16" thick intermediate plate 70*n*, though it is further contemplated that other numbers and relative thicknesses of elastomeric members and intermediate plates are possible and within the intended scope of the invention.

Figure 27:
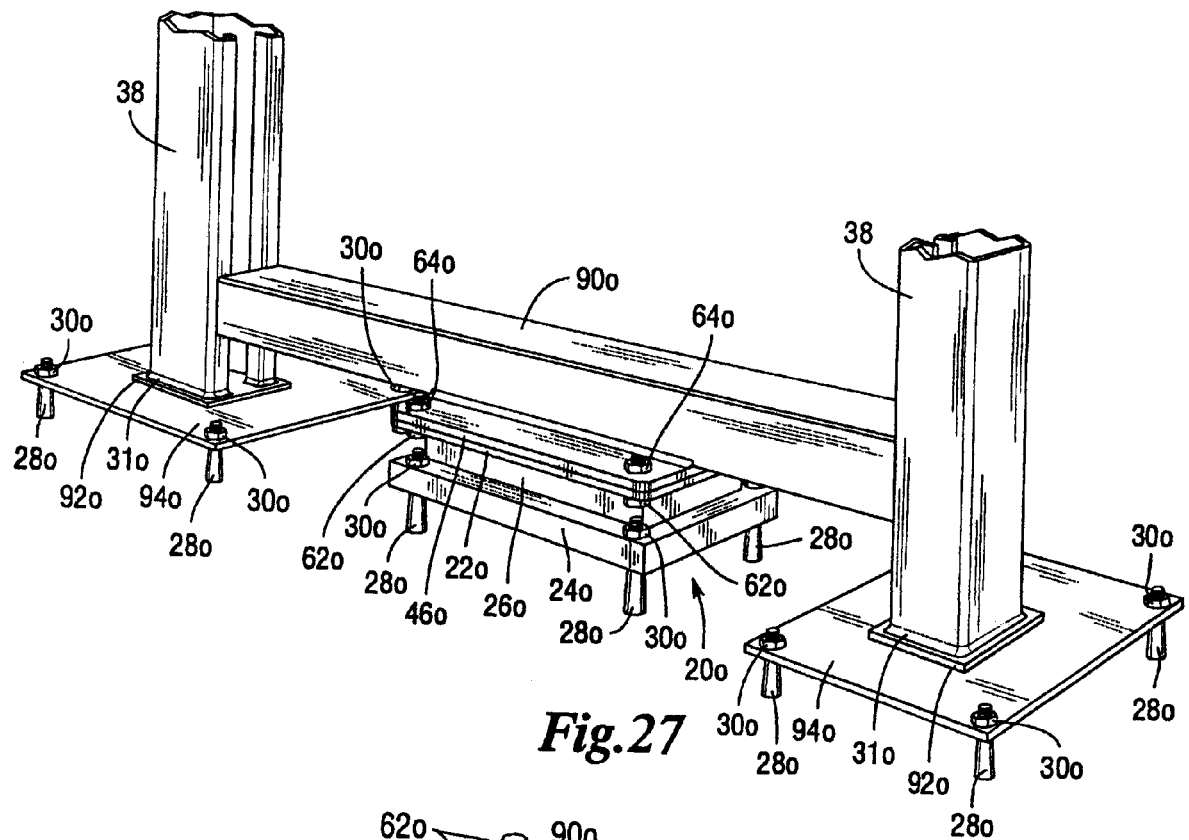
FIG. 27 is a perspective view of another storage rack vibration isolator with a storage rack vibration isolator welded to the bottom of a cross brace between two storage rack columns and attached to the floor.
Figure 28:
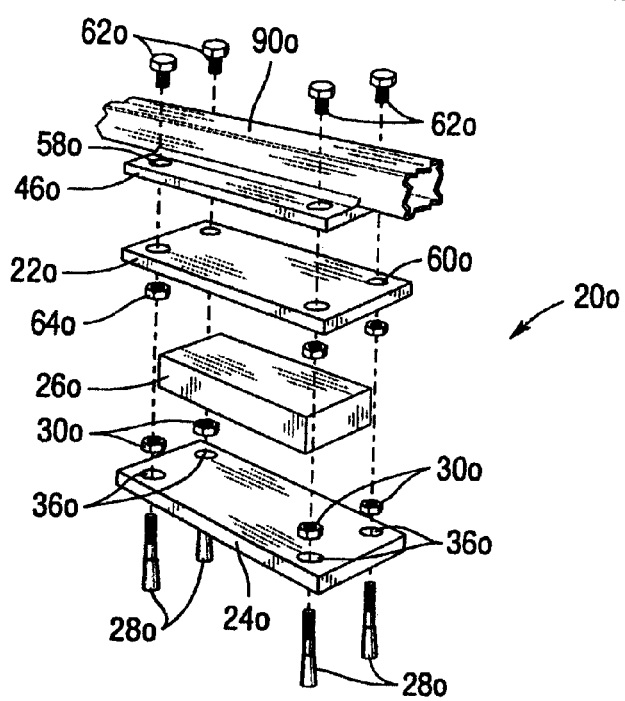
FIG. 28 is an exploded view of a portion of FIG. 27 showing the storage rack vibration isolator attached to the cross brace.

It has been shown above that the storage rack vibration isolators can be attached to the storage racks underneath the columns of the storage rack. However it will be appreciated that connecting the storage rack vibration isolators to other locations on the storage rack system will also provide protection during seismic events. FIG. 27 depicts an assembled storage rack vibration isolator 20*o* according to one embodiment in which the storage rack vibration isolator 20*o* assembly is located between two columns 38 of a storage rack system. FIG. 27 depicts an assembled storage rack vibration isolator 20*o* attached to a cross brace 90*o* welded between two storage rack columns 38. FIG. 28 depicts an exploded view of the storage rack vibration isolator 20*o* attached to the cross brace 90*o*. As best understood by comparing FIG. 27 and FIG. 28, the cross brace 90*o* includes an attachment member 46*o* welded to correspond to where the storage rack vibration isolator 20*o* will be installed along the cross brace 90*o*. The attachment member includes base plate holes 58*o* at the corners that are aligned with mounting plate holes 60*o* of the first mounting plate 22*o* when assembled. The base plate holes 58*o* and mounting plate holes 60*o* are sized to accommodate plate screws 62*o* which provide attachment between the attachment member 46*o* and first mounting plate 22*o* and which can be tightened into position with plate nuts 64*o*. The plate screws 62*o* and plate nuts 64*o* allow the attachment member 46*o* to be detached from the first mounting plate 22*o* without requiring cutting or damage to the storage rack vibration isolator 20*o*.

In this embodiment the elastomeric component comprises a single elastomeric member 26*o*. Attachment of the first mounting plate 22*o* to the elastomeric member 26*o* and the elastomeric member 26*o* to the second mounting plate 24*o* is dependent on the adhesives placed therebetween as described earlier. The second mounting plate 24*o* includes base plate holes 36*o* at the four corners. The threaded ends of anchor bolts 28*o* are placed through the holes 36*o* of the second mounting plate 24*o*. The base nuts 30*o* are tightened against the second mounting plate 24*o* so as to hold the second mounting plate 24*o* tightly against the floor in which the bottoms of anchor bolts 28*o* have been embedded.

The lower ends of the columns 38 are welded to a sliding base pad 92*o* at welds 31*o*. The sliding base pad is sited on top of fixed base pad 94*o*. The fixed base pad 94*o* includes base plate holes (not shown) at the four corners. The threaded ends of anchor bolts 28*o* are placed through the holes (not shown) of the fixed base pad 94*o*. The base nuts 30*o* are tightened against the fixed base pad 94*o* so as to hold the fixed base pad 94*o* tightly against the floor in which the bottoms of anchor bolts 28*o* have been embedded. The lower surface of the sliding base pad 92*o* and/or the upper surface of the fixed base pad 94*o* could have a layer of material having a low coefficient of friction. The fixed base pads 94*o* are sized to cover the area that the storage rack may move in a seismic event.

When a seismic event such as an earthquake occurs, the earth moves and sets up vibrations in multiple directions. The bottoms of anchor bolts 28*o* are held firmly within the concrete floor in which they are embedded, and the base nuts 30*o* fasten the second mounting plate 24*o* and the fixed base pad 94*o* against the floor. As described earlier the second mounting plate 24*o* vibrates laterally with the floor during the seismic event while the elastomeric component absorbs lateral and vertical vibrations and helps to isolate the storage rack from the vibrations caused by the seismic events. The columns 38 are not fixed to the floor and are free to slide over the fixed base pad 94*o*. As a result, the storage rack vibration isolator 20*o* reduces the effects of seismic events on the storage rack system and on the items or materials stored on its storage racks. The potential energy stored in the elastomeric component will tend to return the storage rack system to its original position at the end of a seismic event.

The embodiments that are shown and described with the storage rack vibration isolators are configured to allow for detachment of the cross brace 90*o* from the storage rack vibration isolator 20*o*. It will be appreciated that other methods of attaching the storage rack vibration isolators to the cross brace and to the floor may be used, in addition to any of the embodiments described earlier that show various other means and methods for attaching the storage rack vibration isolator to the columns of the storage rack system and to the floor.

While the storage rack vibration isolator 20*o* could be located anywhere along the length of the cross brace 90*o*, if only one storage rack vibration isolator 20*o* is used between a pair of columns 38 it is preferable for the storage rack vibration isolator 20*o* to be located equidistant from either column.

Figure 29:
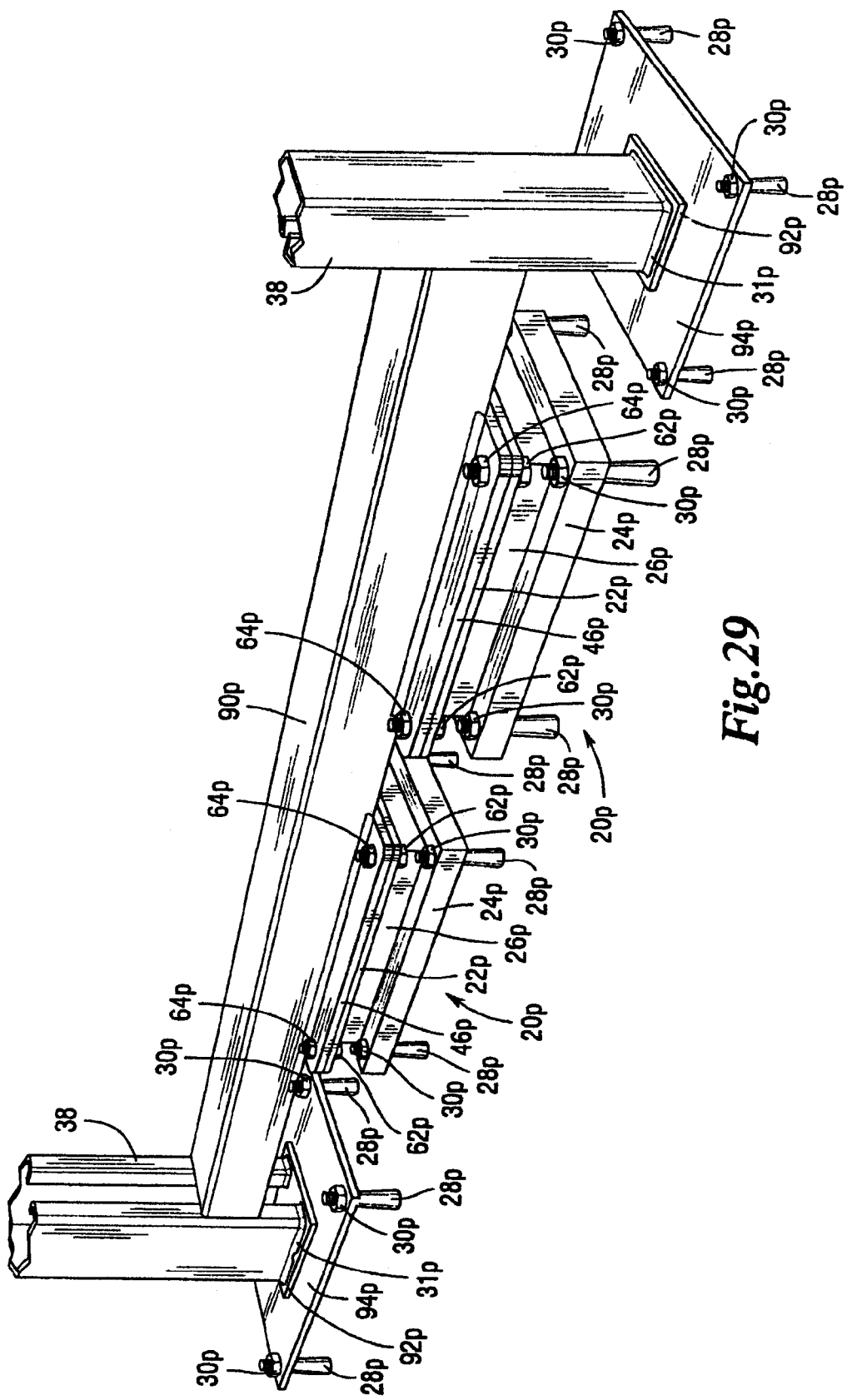
FIG. 29 is a perspective view of two storage rack vibration isolators welded to the bottom of a cross brace between two storage rack columns and attached to the floor.

It will also be appreciated that variations in the configuration vibration isolators are possible and within the contemplated scope of the invention. For example, while FIG. 27 depicts a storage rack vibration isolator system with only one storage rack vibration isolator 20*o* attached to the cross brace 90*o*, it will be appreciated that more than one storage rack vibration isolator may be attached to a cross brace. FIG. 29 depicts a storage rack vibration isolator system according to another embodiment in which two storage rack vibration isolators 20*p* are coupled to the cross brace 90*p*. As with the embodiment depicted in FIG. 27, the storage rack vibration isolators 20*p* have corresponding attachment members 46*p* located where the storage rack vibration isolators 20*p* will be situated along the cross brace 90*p*. As with the previously described embodiments, it will be appreciated that other methods of attaching the storage rack vibration isolators to the cross brace may be used in addition to any of the embodiments described earlier that show various other means and methods for attaching the storage rack vibration isolator to the columns of the storage rack system.

Figure 30:
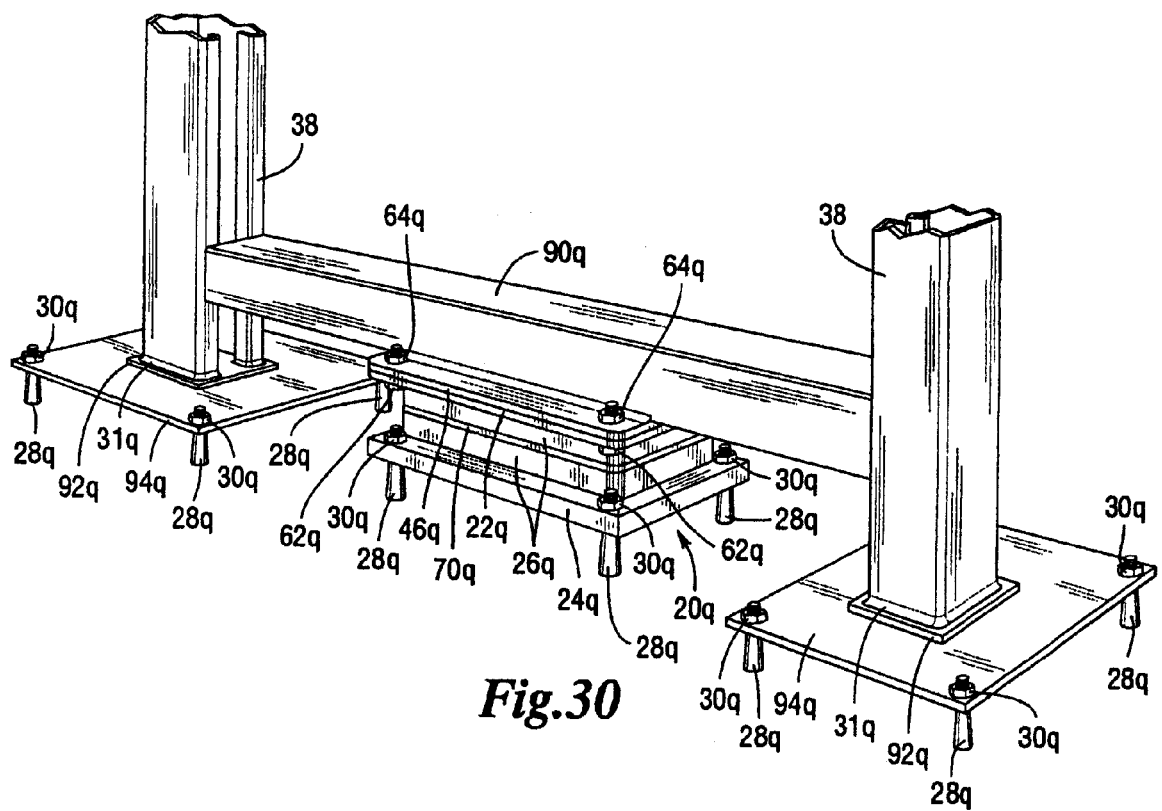
FIG. 30 is a perspective view of another storage rack vibration isolator welded to the bottom of a cross brace between two storage rack columns and attached to the floor.

A storage rack vibration isolator 20*q* having an elastomeric component with multiple laminated elastomeric layers 26*q* with a single storage rack vibration isolators 20*q* attached to the cross brace 90*q* is depicted in FIG. 30 An intermediate plate 70*q* is positioned between the elastomeric layers 26*q* and secured in place with an adhesive. It is contemplated that the adhesive between the elastomeric layers 26*q* and the first mounting plate 22*q*, intermediate plate 70*q*, and second mounting plate 24*q* would be alone sufficient for adequate bonding, though washers such as rectangular washers (FIG. 1, 32) with extended bolts (FIG. 1, 28*a*) or other such additional clamping mechanisms could also be added.

One embodiment of the isolator 20*q*, would incorporate two approximately ½" thick elastomeric layers 26*q* separated by one approximately 1/16" thick intermediate plate 70*q*, though it is further contemplated that other numbers and relative thicknesses of elastomeric members and intermediate plates are possible and within the intended scope of the invention. The storage rack vibration isolator 20q is attached to the cross brace 90q similarly as has been described for FIG. 28. The cross brace 90q includes an attachment member 46q welded to correspond to where the storage rack vibration isolator 20q will be installed along the cross brace 90q. It will be appreciated that this embodiment may be attached to the storage rack system in a manner similar to any of the other embodiments disclosed herein.

Figure 31:
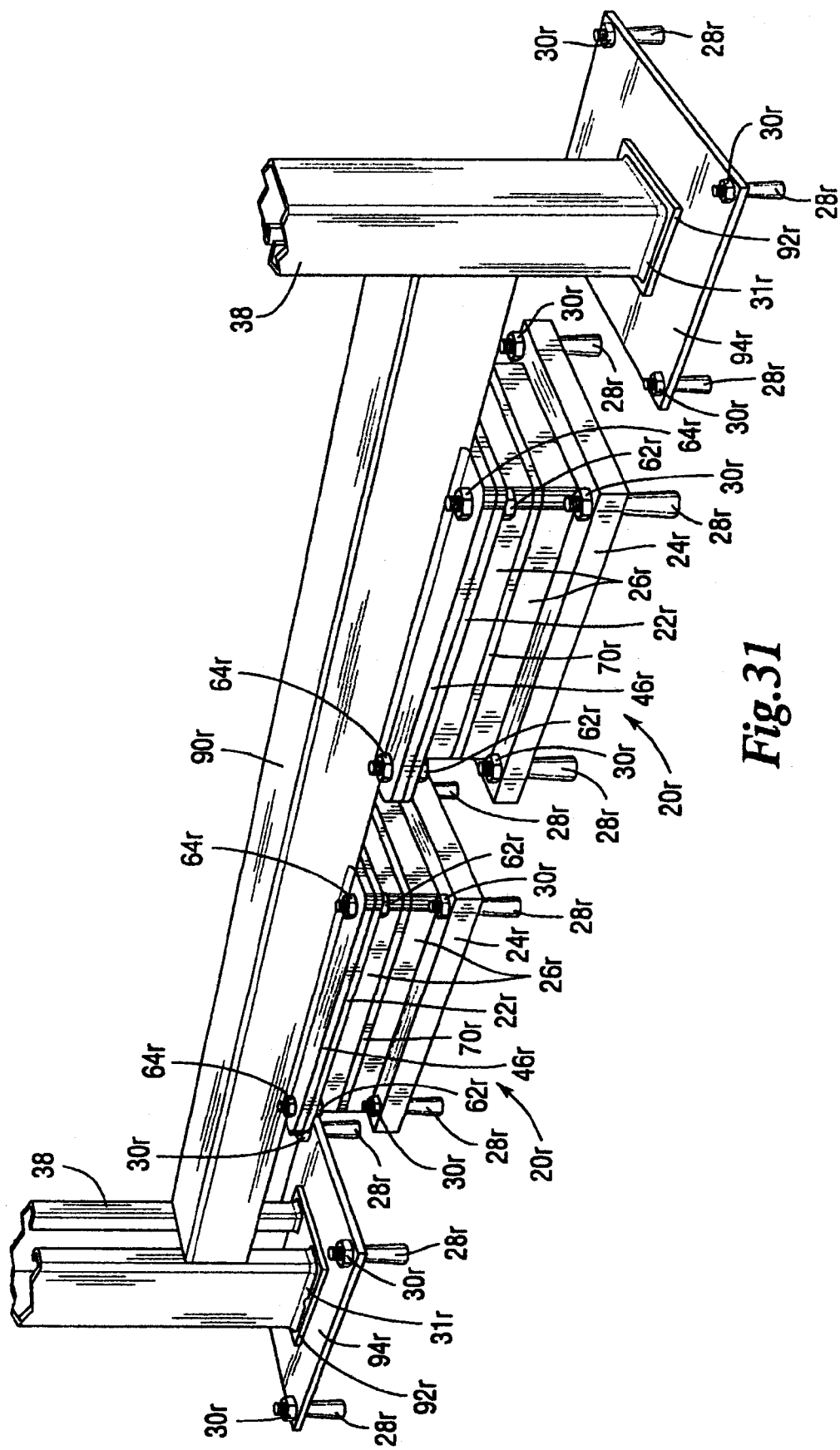
FIG. 31 is a perspective view of two storage rack vibration isolators welded to the bottom of a cross brace between two storage rack columns and attached to the floor.

While FIG. 30 depicts a storage rack vibration isolator system with only one storage rack vibration isolator 20q attached to the cross brace 90q, it will be appreciated that more than one storage rack vibration isolator may be attached to a cross brace. Two storage rack vibration isolators 20r having elastomeric components with multiple laminated elastomeric layers 26r attached to the cross brace 90r is depicted in FIG. 31.

Figure 32:
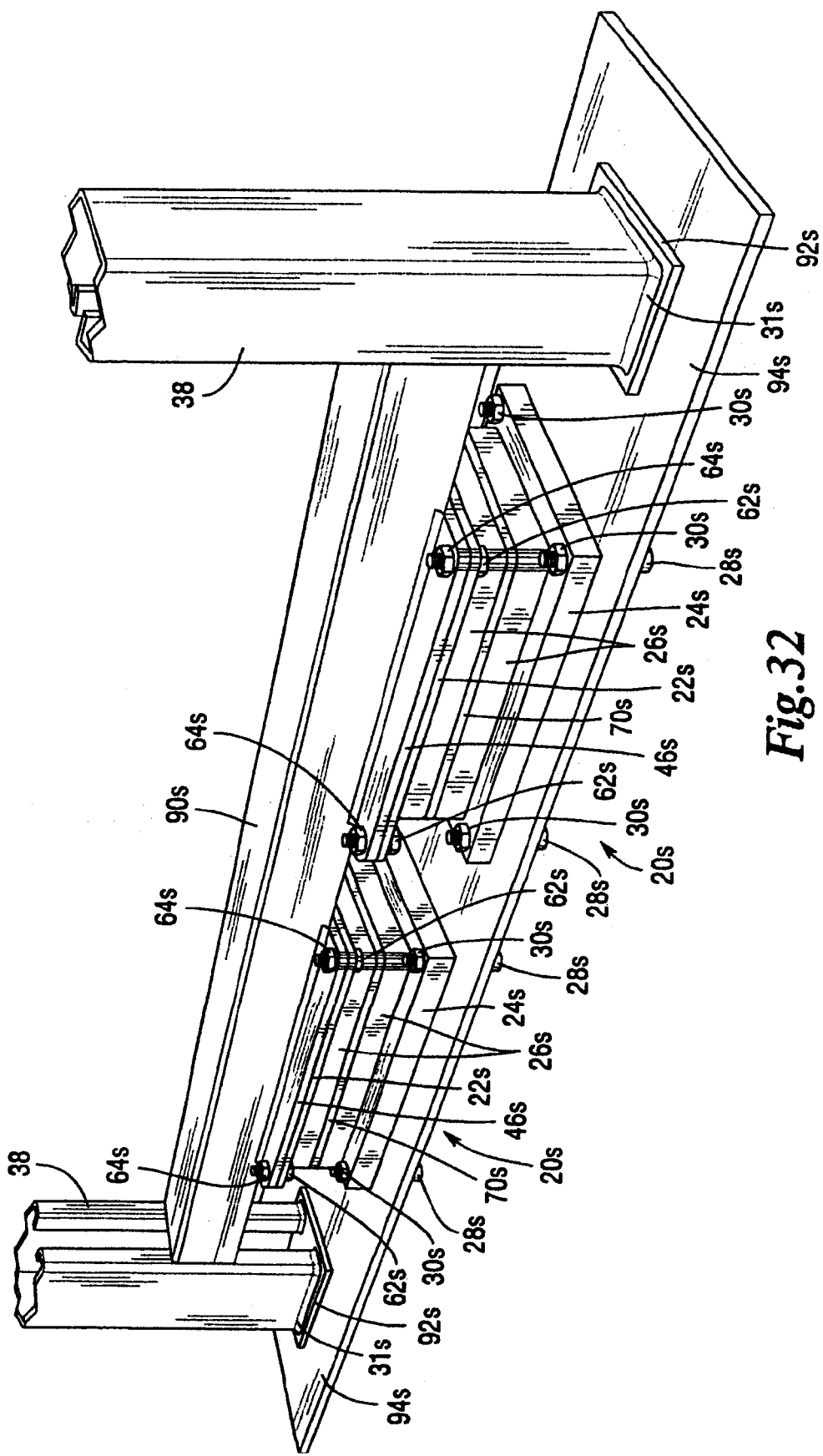
FIG. 32 is a perspective view of another storage rack vibration isolator in which the fixed base pad is a single pad extending between two storage rack columns and attached to the floor.

It will also be appreciated that the low friction bases 94o-94r described and shown in FIGS. 27-31 do not have to be separate pieces for each column 38. FIG. 32 depicts a storage rack vibration isolator system with two storage rack vibration isolators 20s with elastomeric components having multiple laminated elastomeric layers 26s attached to the cross brace 90s. The storage rack vibration isolators 20s are coupled to the fixed base pad 94s that extends under and across the columns 38. The columns 38 of the storage rack system are welded to sliding base pads 92s that rest on the fixed base pad 94s. The fixed base pad 94s is itself coupled to the floor through the storage rack vibration isolators 20s. The lower surface of the base plate 92s and/or the upper surface of the fixed base pad 94s could have a layer of material having a low coefficient of friction. The fixed base pads 94s are sized to cover the area that the storage rack may move in a seismic event. It will be appreciated that this single piece fixed base pad 94s would be applicable to any variation that requires a fixed base pad for the columns 38.

It will also be appreciated that the sliding base pads 94o-94s described and shown in FIGS. 27-32 could be replaced by or supplemented with equivalent structures that would allow or assist the columns 38 to slidably move in relation to the storage rack vibration isolator system in the event of seismic activity such as ball bearings, wheels, casters, etc.

Figure 33:
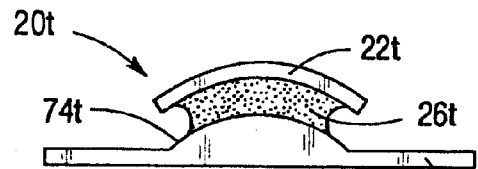
FIG. 33 is a partial side view of another structure that can be used to construct storage rack vibration isolators.

In some embodiments, the cross sectional geometry of the mounting plates and elastomeric member or members of the elastomeric component can also be used to control storage rack vibration isolator stability. This would additionally create a structure that restricts the movement of the elastomeric component to substantially one horizontal direction. FIG. 33 depicts a storage rack vibration isolator 20t having a curved first mounting pate 22t and a second mounting plate 24t having a curved upper surface 74t. An elastomeric member 26t is positioned between the curved first mounting plate 22t and second mounting plate 24t and bonded to the first and second mounting plates 22t and 24t with an adhesive. The elastomeric member 26t is also curved in shape so that a compression component is exerted against the elastomeric member 26t by the curved first mounting plate 22t and/or curved upper surface 74t of the second mounting plate 24t when a force is applied to the first and/or second mounting plates 22t and 24t that includes a component in a lateral or side direction. As the elastomeric member 26t absorbs and dissipates such exerted forces, the curved shaping tends to cause the storage rack vibration isolator 20t to return to a stable and upright position as shown. Thus the particular shaping of the mounting plates 22t and 24t and elastomeric component allows compression components to be used to improve overall stability during a seismic event.

Since the first mounting plate 22t and second mounting plate 24t are curved along the lateral or side-to-side directions, the shear stiffness $K_{shear}$ increases along the same directions. Thus, the storage rack vibration isolator 20t of FIG. 33 is especially useful where it is desirable to increase the shear stiffness $K_{shear}$ along only one axis without effecting such an increase along a perpendicular axis (e.g. along the front and back directions) and without changing the overall compression stiffness, $K_{compression}$ of the isolator 20t. In effect, the storage rack vibration isolator 20t functions in substantially one horizontal direction and should be incorporated into a rack system to take advantage of such effects.

Figure 34:
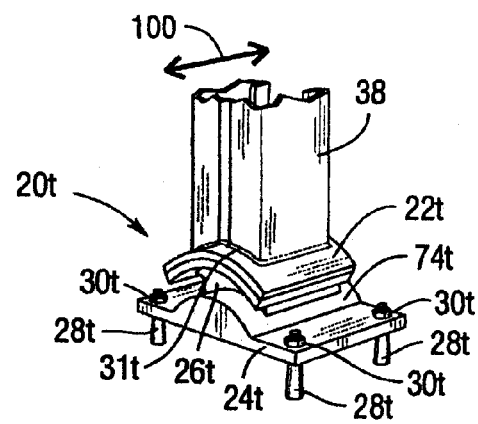
FIG. 34 is a perspective view of an application of the structure depicted in FIG. 33 installed on the bottom of a storage rack column.
Figure 35:
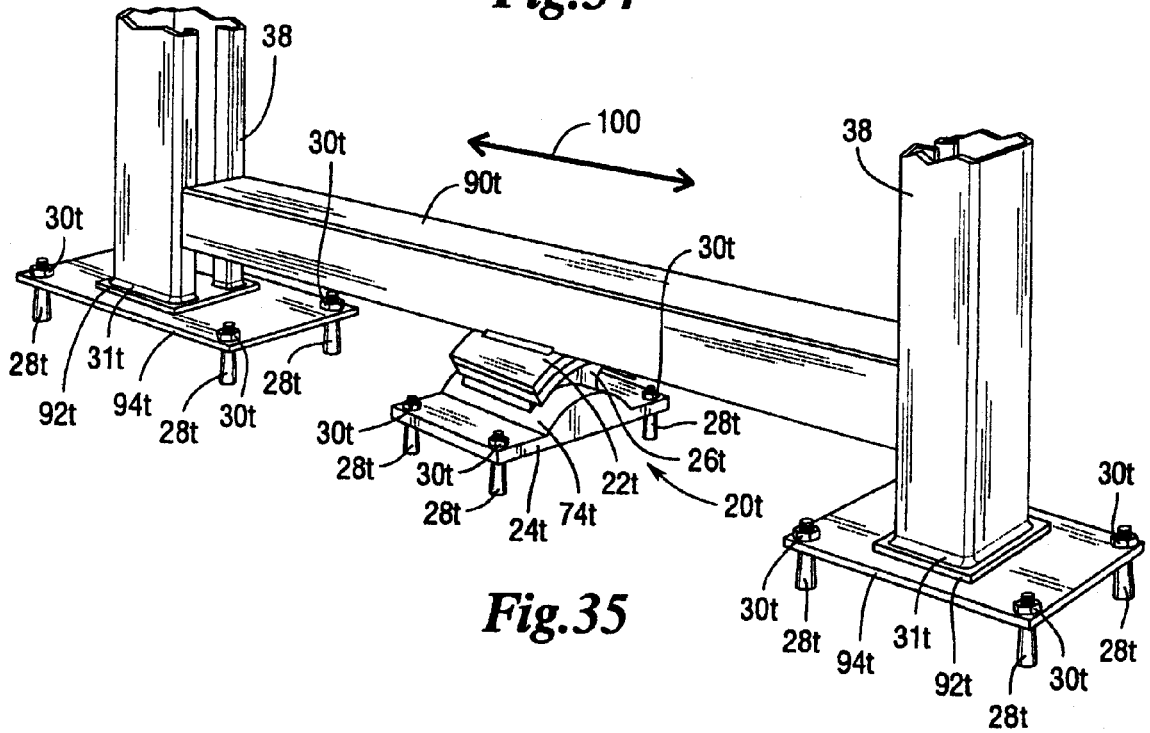
FIG. 35 is a perspective view of an application of the structure depicted in FIG. 33 installed on the bottom of cross brace between two storage rack columns.

FIG. 34 depicts the storage rack vibration isolator depicted in FIG. 33 as applied to the bottom of the column 38. The storage rack base isolator 20t is welded to the column 38 at weld 31t. The configuration of the elastomeric component will restrict movement to substantially one horizontal direction as indicated by directional arrows 100. FIG. 35 depicts the storage rack vibration isolator depicted in FIG. 33 as applied to a cross brace 90t of a storage rack system. The storage rack base isolator 20t is welded to the cross brace 90t. The structure of the elastomeric component will restrict movement to substantially one horizontal direction as indicated by directional arrows 100.

Figure 36:
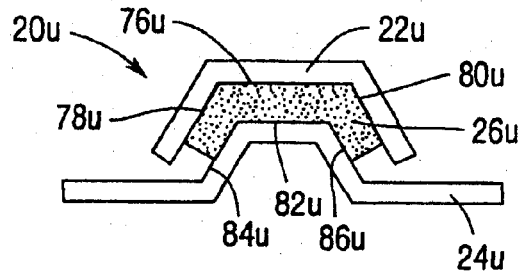
FIG. 36 is a partial side view of a structure that can be used to construct storage rack vibration isolators.

FIG. 36 depicts a storage rack vibration isolator 20u that includes a structure that restricts the movement of the elastomeric component to substantially one horizontal direction. The elastomeric component has multiple flat surfaces that manipulate compression components for enhanced stability. The first mounting plate 22u includes a top contact surface 76u, a first side contact surface 78u and a second side contact surface 80u. The second mounting plate 24u includes a top positioning surface 82u, a first side positioning surface 84u and a second side positioning surface 86u. The elastomeric member 26u is positioned between the first and second mounting plates 22u and 24u and is adhesively bonded to each of the surfaces 76u, 78u, 80u, 82u, 84u, and 86u.

When a compression component is exerted against the elastomeric member 26u by the top contact surface 76u of the curved first mounting plate 22u and/or by the top positioning surface 82u of the second mounting plate 24u, the downward and/or upward compression component(s) can be absorbed and dissipated by the elastomeric member 26u. If a lateral component is exerted by the first or second side contact surfaces 78u or 80u of the first mounting plate 22u or the first or second side positioning surfaces 84u or 86u of the second mounting plate 24u, as the elastomeric member 26u absorbs and dissipates such exerted forces, contact with the side surfaces 78u, 80u, 84u, and 86u will tend to cause the elastomeric member 26u to return the storage rack vibration isolator 20u to a stable and upright position as shown, thereby using laterally-exerted compression components to improve overall stability during a seismic event.

Contact by the elastomeric member 26u with the first and second side contact surfaces 78u and 80u and the first and second side positioning surfaces 84u and 86u also increases shear stiffness $K_{shear}$ along the lateral or side-to-side directions. Thus, the storage rack vibration isolator 20u also allows an increase in shear stiffness $K_{shear}$ along only one axis without effecting such an increase along a perpendicular axis (e.g. along the front and back directions) without changing the overall compression stiffness $K_{compression}$ of the isolator 20u. In effect, similarly to the storage rack vibration isolator of FIG. 36, the storage rack vibration isolator 20u functions in substantially one horizontal direction and should be incorporated into a rack system to take advantage of such effects.

Figure 37:
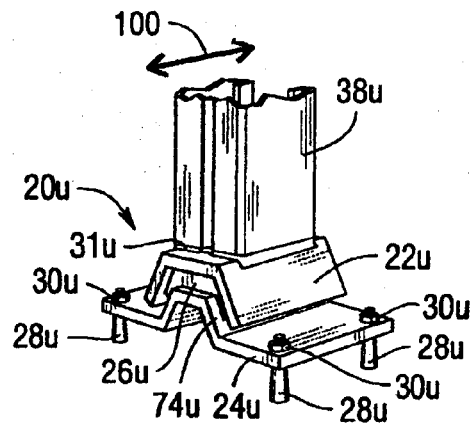
FIG. 37 is a perspective view of an application of the structure depicted in FIG. 36 installed on the bottom of a storage rack column.
Figure 38:
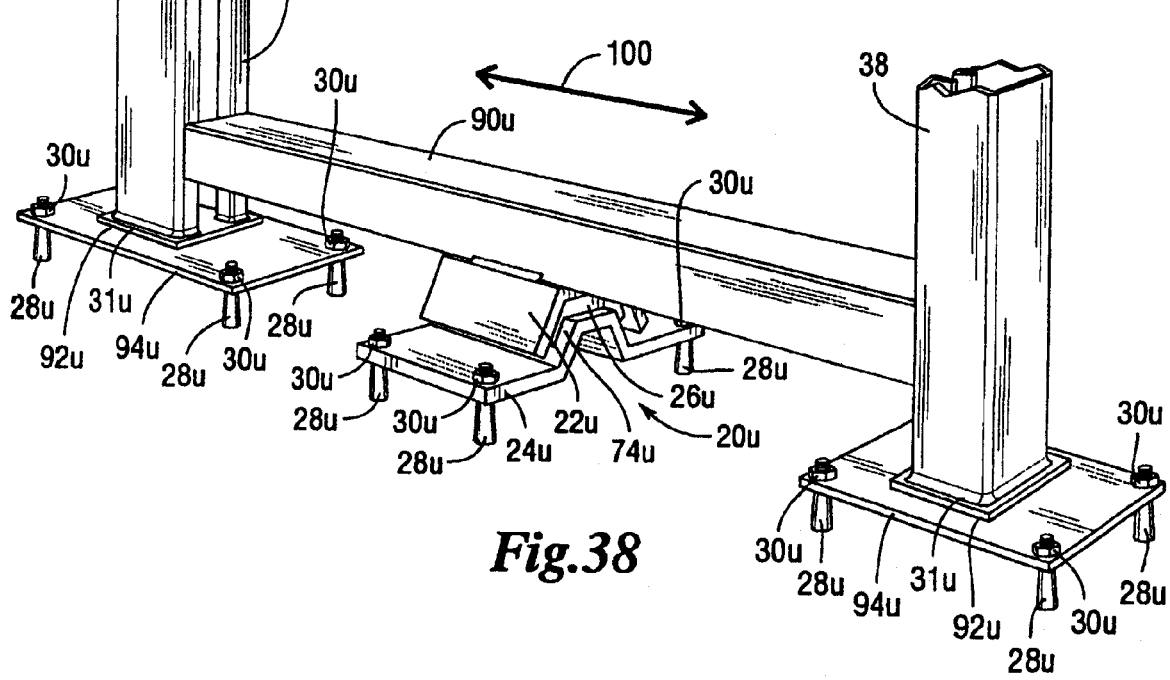
FIG. 38 is a perspective view of an application of the structure depicted in FIG. 36 installed on the bottom of cross brace between two storage rack columns.

FIG. 37 shows the storage rack vibration isolator depicted in FIG. 36 as applied to the bottom of the column 38. The storage rack base isolator 20u is welded to the column 38 at weld 31u. The configuration of the elastomeric component will restrict movement to substantially one horizontal direction as indicated by directional arrows 100. FIG. 38 depicts the storage rack vibration isolator depicted in FIG. 36 as applied to a cross brace 90u of a storage rack system. The storage rack base isolator 20u is welded to the cross brace 90u. The structure of the elastomeric component will restrict movement to substantially one horizontal direction as indicated by directional arrows 100.

Limiting the seismic dampening effect of the storage rack vibration isolators in only one direction has certain advantages in storage rack systems. By the nature of their construction and design, many storage rack systems are much more flexible in the down-aisle direction and are significantly stiffer across the aisle. One solution to creating unidirectional seismic dampening is as suggested by the structure of the vibration dampeners described in FIGS. 33 to 38. Another solution would be to incorporate a structure outside the elastomeric component that mechanically restricts the movement of the seismic isolation system. In essence this would function as a unidirectional seismic dampening system. Such modifications could additionally provide protection to the storage rack vibration isolator assembly from side impacts in high-traffic areas.

Figure 39:
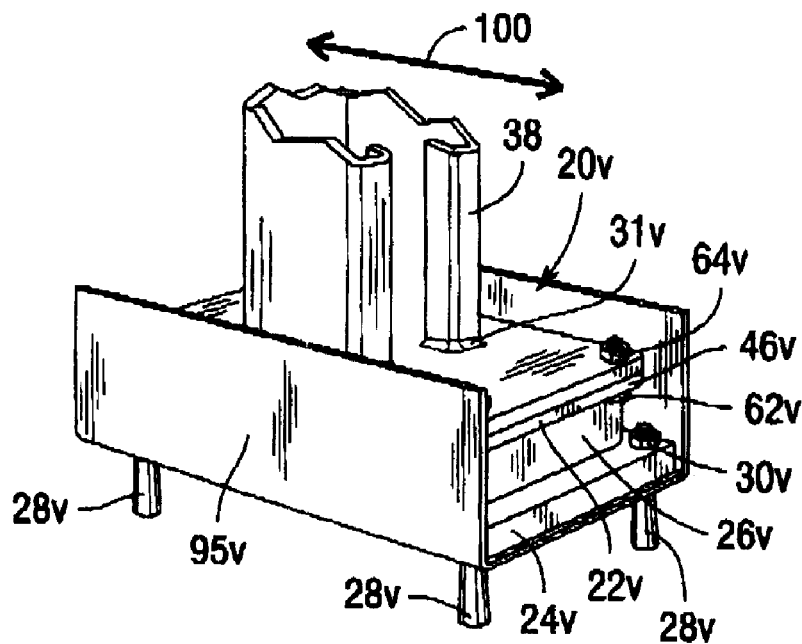
FIG. 39 is a perspective view of another storage rack vibration isolator installed on the bottom of a rack column.

FIG. 39 depicts a storage rack vibration isolator 20v attached to the bottom of a column 38. The U-shaped restriction element 95v is a structure that restricts movement of the storage rack vibration isolator 20v to substantially one horizontal direction parallel to the restriction element 95v in the direction depicted by the directional arrows 100. While the restriction element substantially restricts movement perpendicular to the directional arrows 100, there is room for some movement in that direction which imparts some dampening in the down aisle direction. It will be appreciated that similar modifications could work equally well in other combinations and types of storage rack vibration isolators. It will be understood that some features depicted in FIG. 39 have not been discussed because they are common to previously described embodiments. It will be understood that generally these features are similar in form or function across the embodiments.

Figure 40:
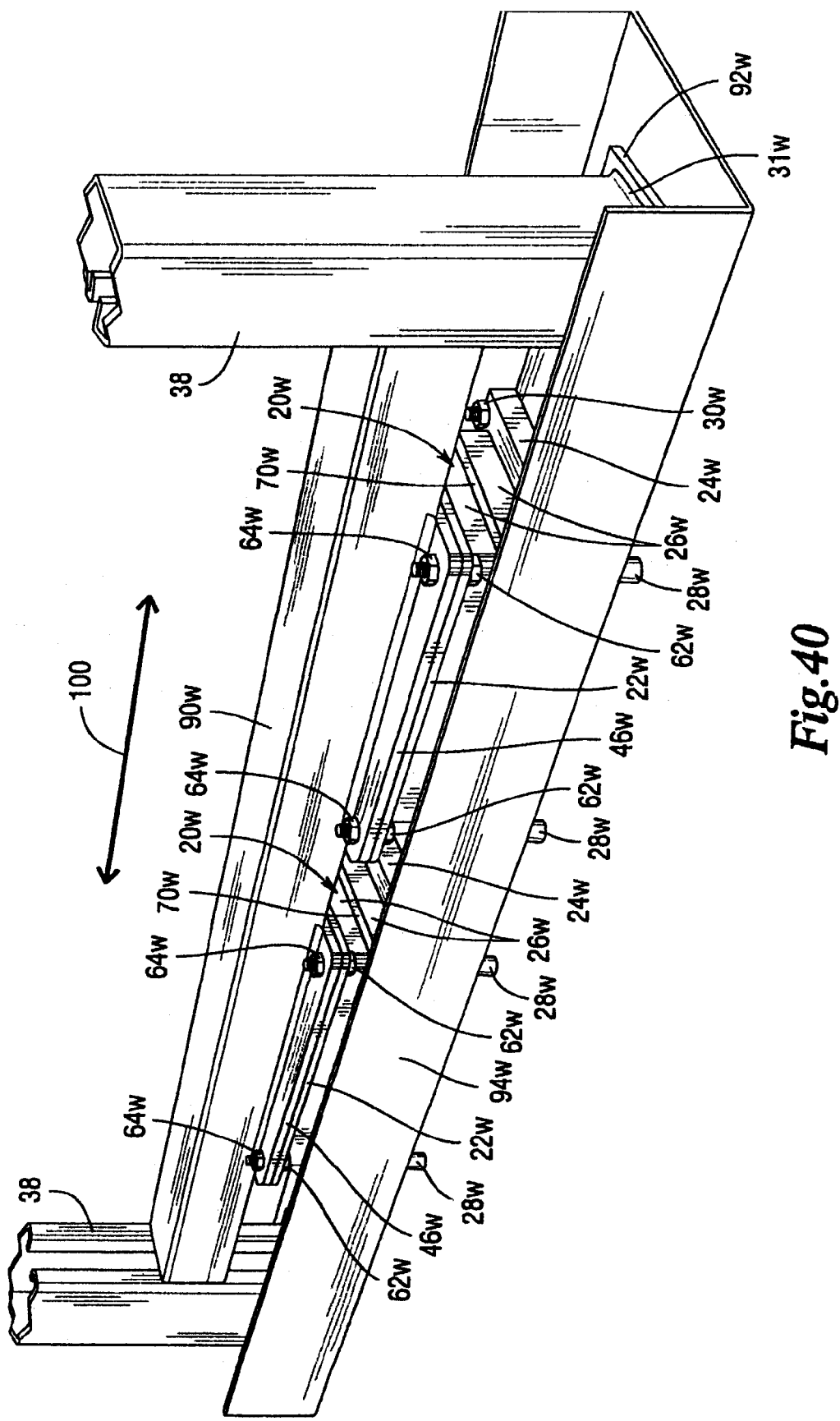
FIG. 40 is a perspective view of two storage rack vibration isolators installed on the bottom of a cross brace between two storage rack columns and attached to the floor.

FIG. 40 depicts storage rack vibration isolators 20w attached to cross brace 90w. The fixed base pad 94w has been modified into a U-shaped trough in which the storage rack vibration isolators 20w are housed. The modified fixed base pad 94w also serves as a structure that restricts the movement of the storage rack vibration isolator 20w to one substantially horizontal direction parallel to the modified fixed base pad 94w in the direction depicted by the directional arrows 100. While the restriction element substantially restricts movement perpendicular to the directional arrows 100, there is room for some movement in that direction which imparts some additional dampening in the down aisle direction. It will be appreciated that similar modifications would work equally well in other combinations of storage rack vibration isolator types and numbers. It will be understood that some features depicted in FIG. 40 have not been discussed because they are common to previously described embodiments. It will be understood that generally these features are similar in form or function across the embodiments.

Figure 41:
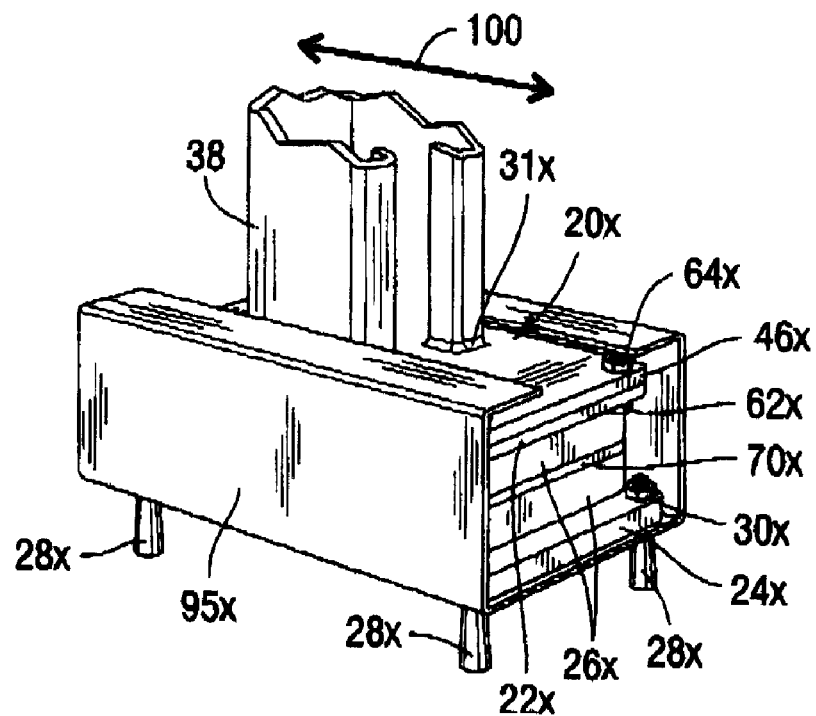
FIG. 41 is a perspective view of another storage rack vibration isolator installed on the bottom of a rack column.

FIG. 41 depicts a modification of the restriction element 95v of FIG. 39. The restriction element 95x is further bent over the storage rack vibration isolator 20x to provide additional support against substantial vertical movement of the storage rack vibration isolator 20x. At the same time, the restriction element is sized to not interfere with the movement of the storage rack vibration isolator in the direction indication by directional arrows 100. The end of the restriction element 95x could be coated with an elastomer or other shock absorbing material, such as rubber, etc., to help absorb the vertical impact of the vibration isolator 20x during seismic events. While the restriction element substantially restricts movement perpendicular to the directional arrows 100, there is room for some movement in that direction which imparts some additional dampening in the down aisle direction. Similarly there is also some room for movement of the storage rack vibration isolator in the vertical direction, which imparts some dampening in the vertical direction. It will be understood that some features depicted in FIG. 41 have not been discussed because they are common to previously described embodiments. It will be understood that generally these features are similar in form or function across the embodiments.

Figure 42:
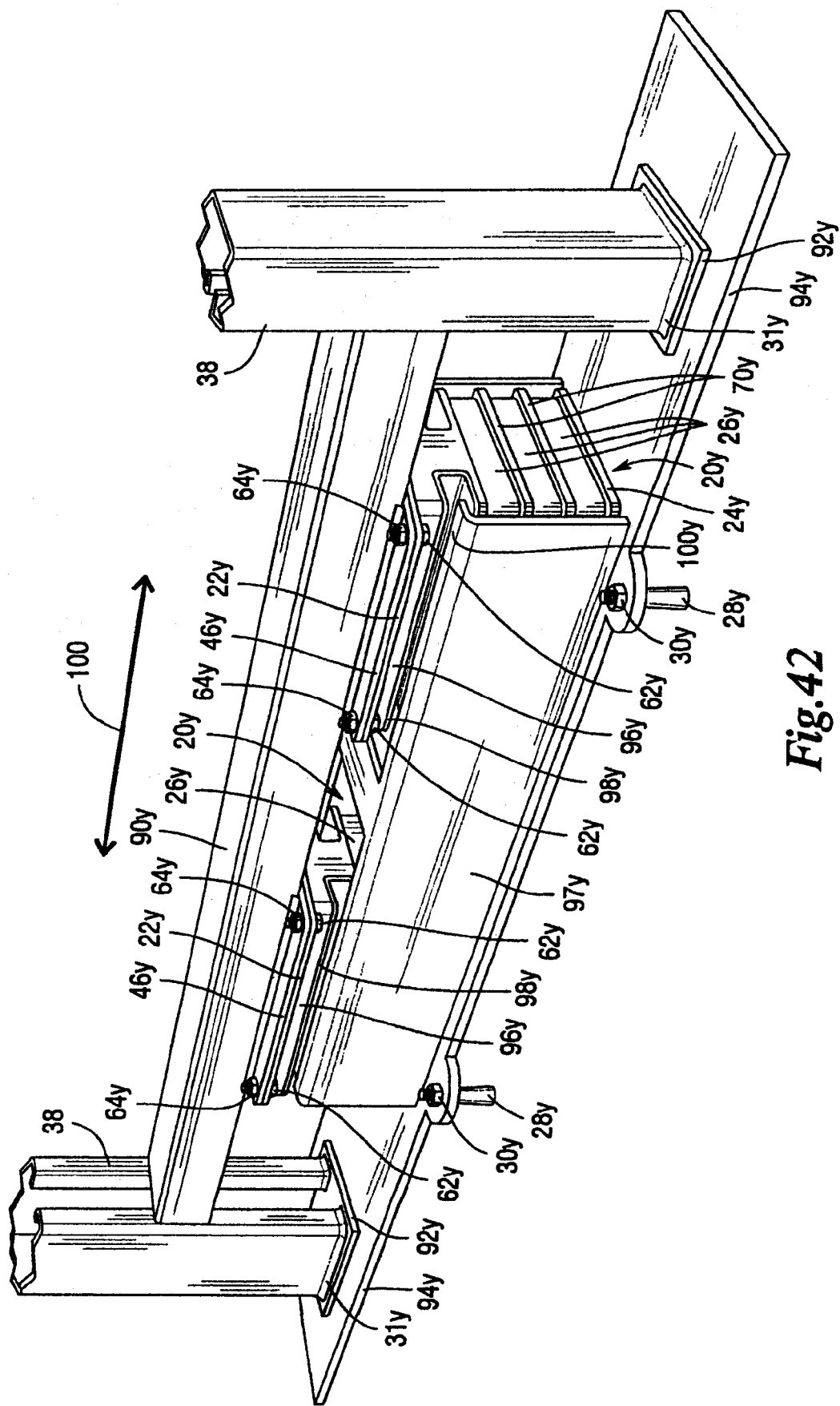
FIG. 42 is a perspective view of two storage rack vibration isolators installed on the bottom of a cross brace between two storage rack columns and attached to the floor.

FIG. 42 depicts another embodiment incorporating a structure that restricts the movement of the storage rack vibration isolators 20y. In this embodiment, the fixed base pad 94y extends under and between the columns 38 of the storage rack. Two storage rack vibration isolators 90y are attached to the cross brace 90y at the attachment members 46y as described earlier. However, in this embodiment, the first mounting plate 22y is a flange that creates a slot in which the restriction element 97y can fit into. The first mounting plate 22y has an elastomer coating 98y to help absorb the vertical impact of the vibration isolator 20y during seismic events. The elastomer coating 98y could be any shock absorbing material such as rubber, etc. During seismic events, the restriction element 97y serves to substantially restrict the horizontal movement of the storage rack vibration isolator 20y to one horizontal directional parallel to the fixed base pad 94y in the direction depicted by the directional arrows 100, as well as to substantially restrict vertical movement of the storage rack vibration isolator 20y. While the restriction element substantially restricts movement perpendicular to the directional arrows 100, there is room for some movement in that direction which imparts some additional dampening in the down aisle direction. Similarly there is also some room for movement of the storage rack vibration isolator in the vertical direction, which imparts some dampening in the vertical direction. It will be understood that some features depicted in FIG. 42 have not been discussed because they are common to previously described embodiments. It will be understood that generally these features are similar in form or function across the embodiments.

Figure 43:
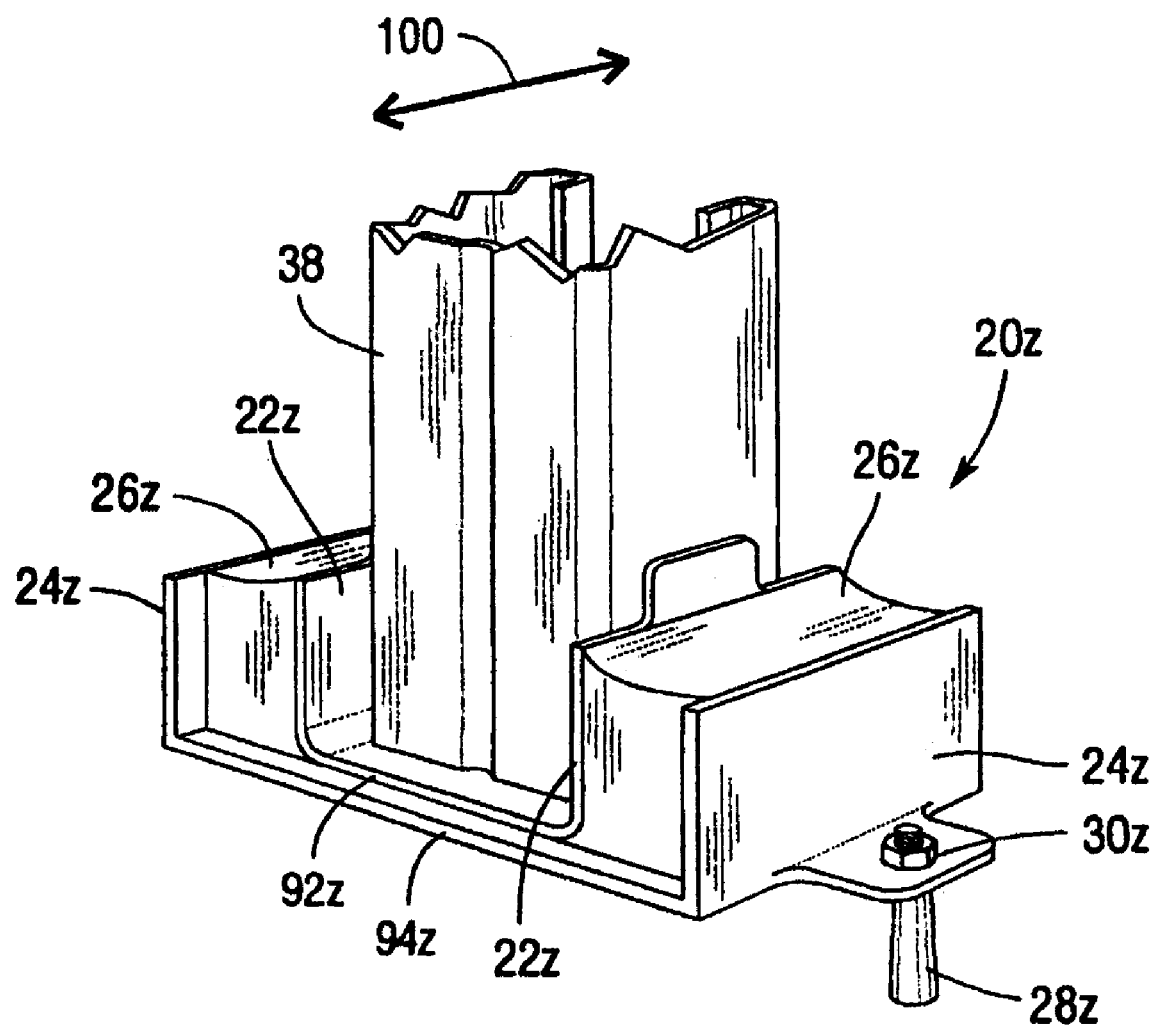
FIG. 43 is a perspective view of another storage rack vibration isolator installed on the bottom of a rack column.

FIG. 43 depicts an embodiment in which the storage rack vibration isolators 20z are attached to the bottom of the columns 38 of the storage rack system. In this embodiment two first mounting plates 22z and two second mounting plate 24z are perpendicular to the floor with the elastomeric component extending between them. In this embodiment, the elastomeric component comprises a single elastomeric member 26z on either side of the column 38. Each first mounting plate 22z is attached to a sliding base plate 92z that extends under the column 38. The sliding base plate 92z rests on a fixed base plate 94z to which each second mounting plate 24z is attached. A layer of low friction bearing material may be interposed between the fixed base plate 94z and the sliding base plate 92z.

The structure and orientation of the two second mounting plates 24z serves to restrict the horizontal movement of the storage rack vibration isolator 20z to substantially one horizontal directional parallel to the two second mounting plates 24z in the direction depicted by the directional arrows 100. Nevertheless, the nature of elastomeric component allows from some compression in the direction perpendicular to the directional arrows 100 therefore some dampening is provided in that direction.

Figure 44:
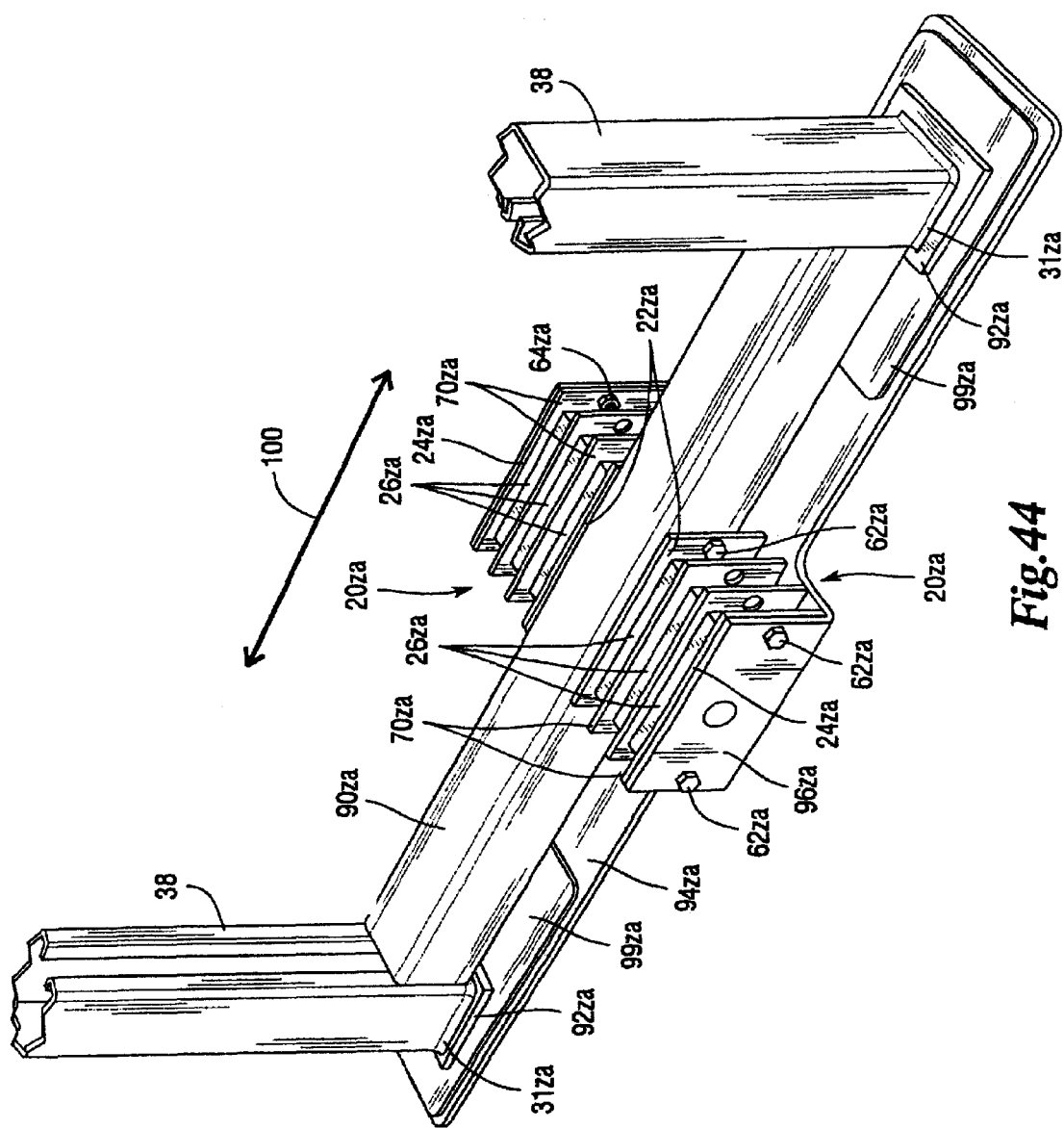
FIG. 44 is a perspective view of two storage rack vibration isolators installed on the bottom of a cross brace between two storage rack columns and attached to the floor.

The embodiment depicted in FIG. 43 is depicted with the storage rack vibration isolated located under and adjacent to the columns of the storage rack system. However, other configurations of this type of storage rack vibration isolator are possible. FIG. 44 depicts one such variation. In this embodiment, each storage rack vibration isolator 20za comprises two sets of elastomeric components on either side of a cross brace 90za that is welded between two storage rack columns 38. The first mounting plate 22za of each elastomeric component is bolted to the cross brace 90za. The second mounting plate 24za of each elastomeric component is attached to a fixed base pad 94za at the perpendicular brace element 96za. The fixed base plate 94za extends across and under each column 38. The columns 38 of the storage rack system are welded to sliding base pads 92za that rest on the fixed base pad 94za. The fixed base pad 94za is itself coupled to the floor. A layer of low friction bearing material 99za is interposed between the sliding base pad 92za and the fixed base pad 94za. The fixed base pad 94za is sized to cover the area that the storage rack may move in a seismic event. In this embodiment each elastomeric component comprises three elastomeric members 26za with two intermediate plates 70za. The structure and orientation of the elastomeric components serves to substantially restrict the horizontal movement of the storage rack vibration isolator 20za to substantially one horizontal directional in the direction depicted by the directional arrows 100. Nevertheless, the nature of elastomeric component allows from some compression in the direction perpendicular to the directional arrows 100 therefore some dampening is provided in that direction.

Figure 45:
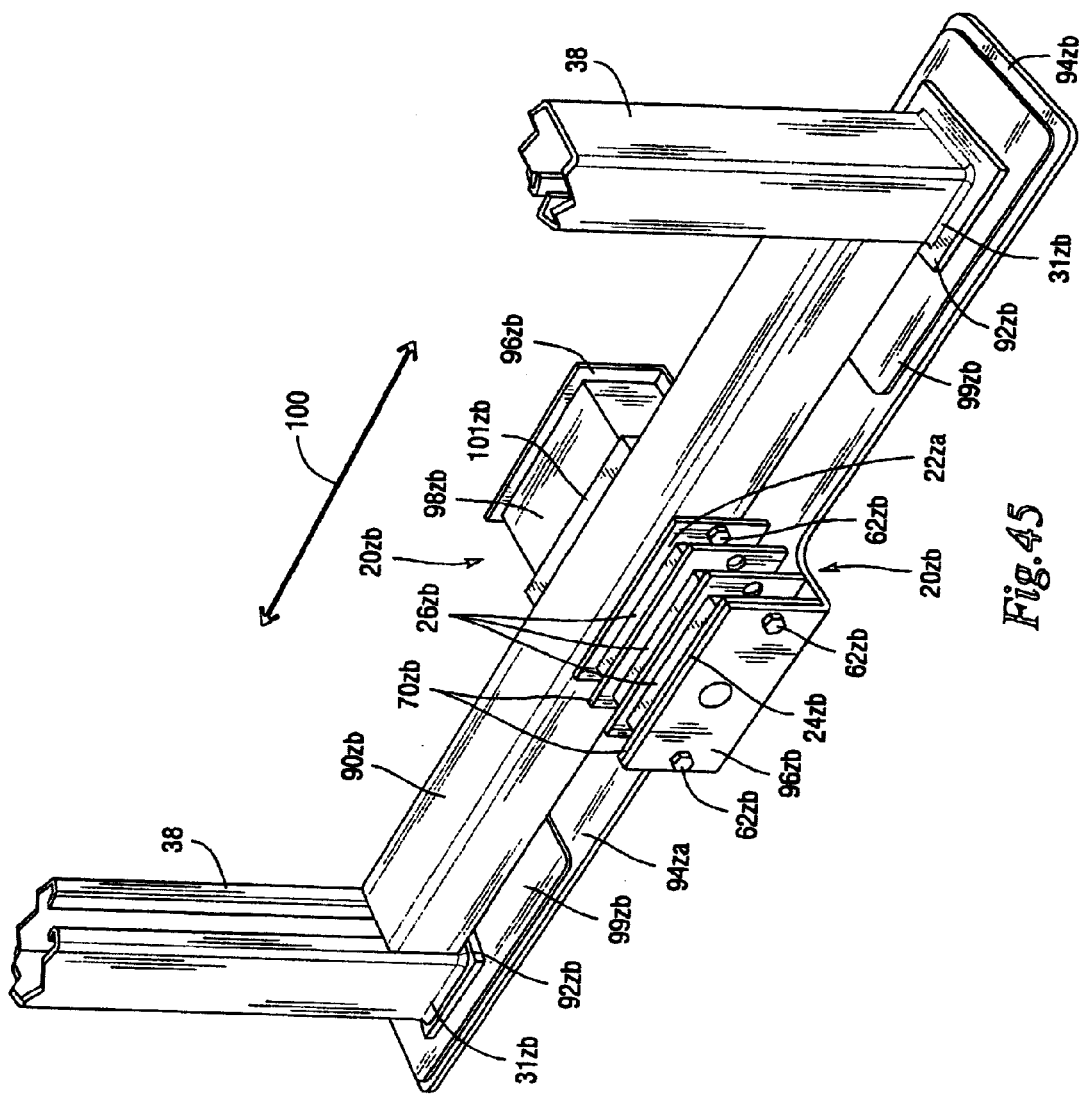
FIG. 45 is a perspective view of two storage rack vibration isolators installed on the bottom of a cross brace between two storage rack columns and attached to the floor.

FIG. 45 depicts an embodiment of storage rack vibration isolators 20zb with an elastomeric component coupled to one side of cross brace 90zb and a steel block 98zb on the opposite side of the cross brace 90zb. An elastomeric bumper 101zb is attached to the steel block 98zb on the side adjacent the cross brace 90zb to absorb the impact of the cross brace 90zb against the steel block 98zb during seismic events. The structure and orientation of the elastomeric components and the steel block 98zb serves to restrict the horizontal movement of the storage rack vibration isolator 20za to substantially one horizontal directional in the direction depicted by the directional arrows 100. Here again, the nature of elastomeric component allows from some compression in the direction perpendicular to the directional arrows 100 therefore some dampening is provided in that direction.

Figure 46:
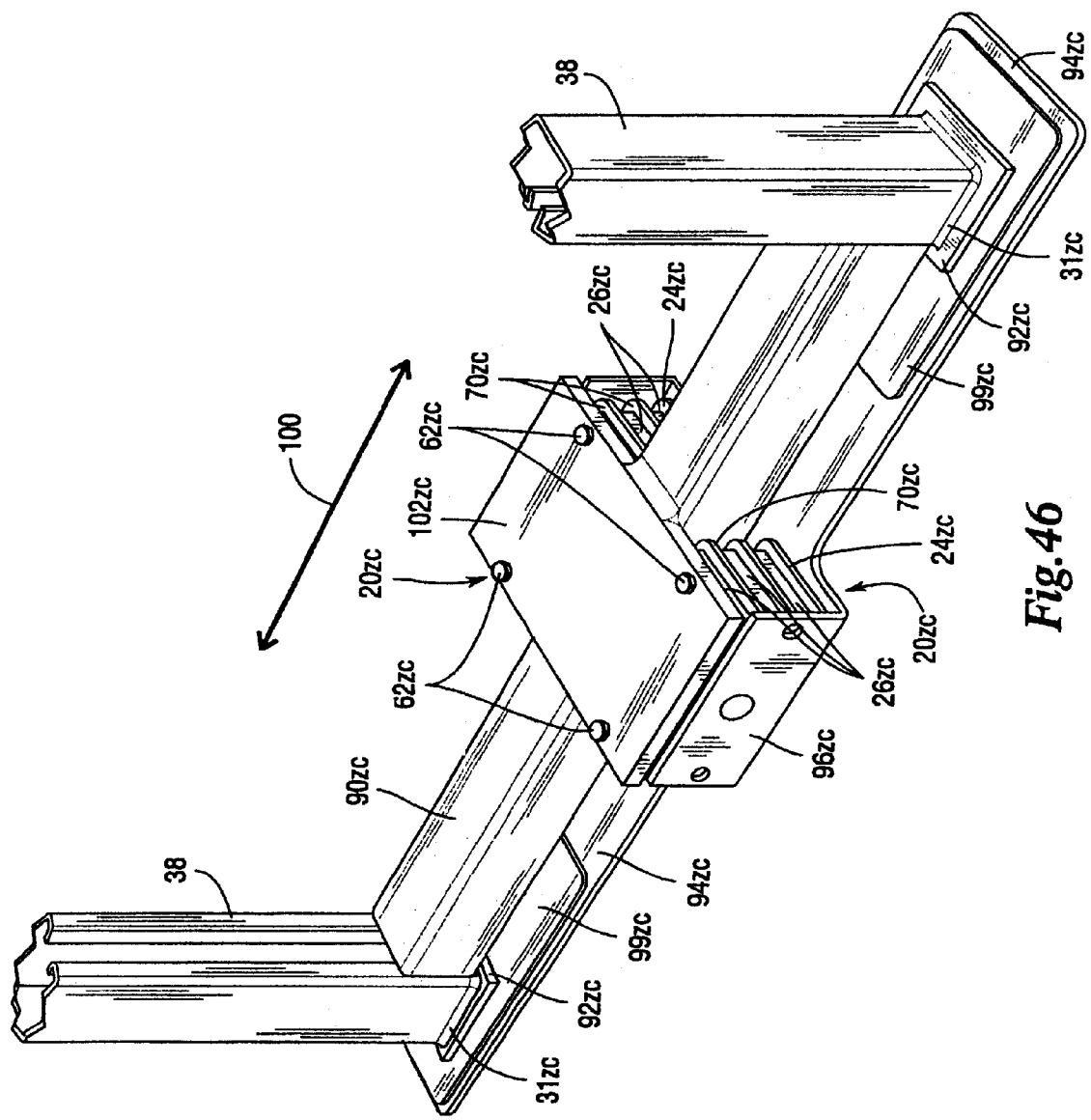
FIG. 46 is a perspective view of two storage rack vibration isolators installed on the bottom of a cross brace between two storage rack columns and attached to the floor.

FIG. 46 depicts another embodiment with storage rack vibration isolators 20zc on either side of cross brace 90zc. The second mounting plates 24zc of the storage rack vibration isolators 20zc are mounted on a fixed base plate 94zc having a vertical component 96zc that serves to restrict the horizontal movement of the storage rack vibration isolator 20zc to substantially one horizontal directional in the direction depicted by the directional arrows 100. The first mounting plate (not shown) of the storage rack vibration isolator 20zc is coupled to a top plate 102zc that is welded to the cross brace 90zc. While movement perpendicular to the directional arrows 100 is substantially restricted in this embodiment, there is room for some movement in that direction which imparts some dampening in the down aisle direction.

Figure 47:
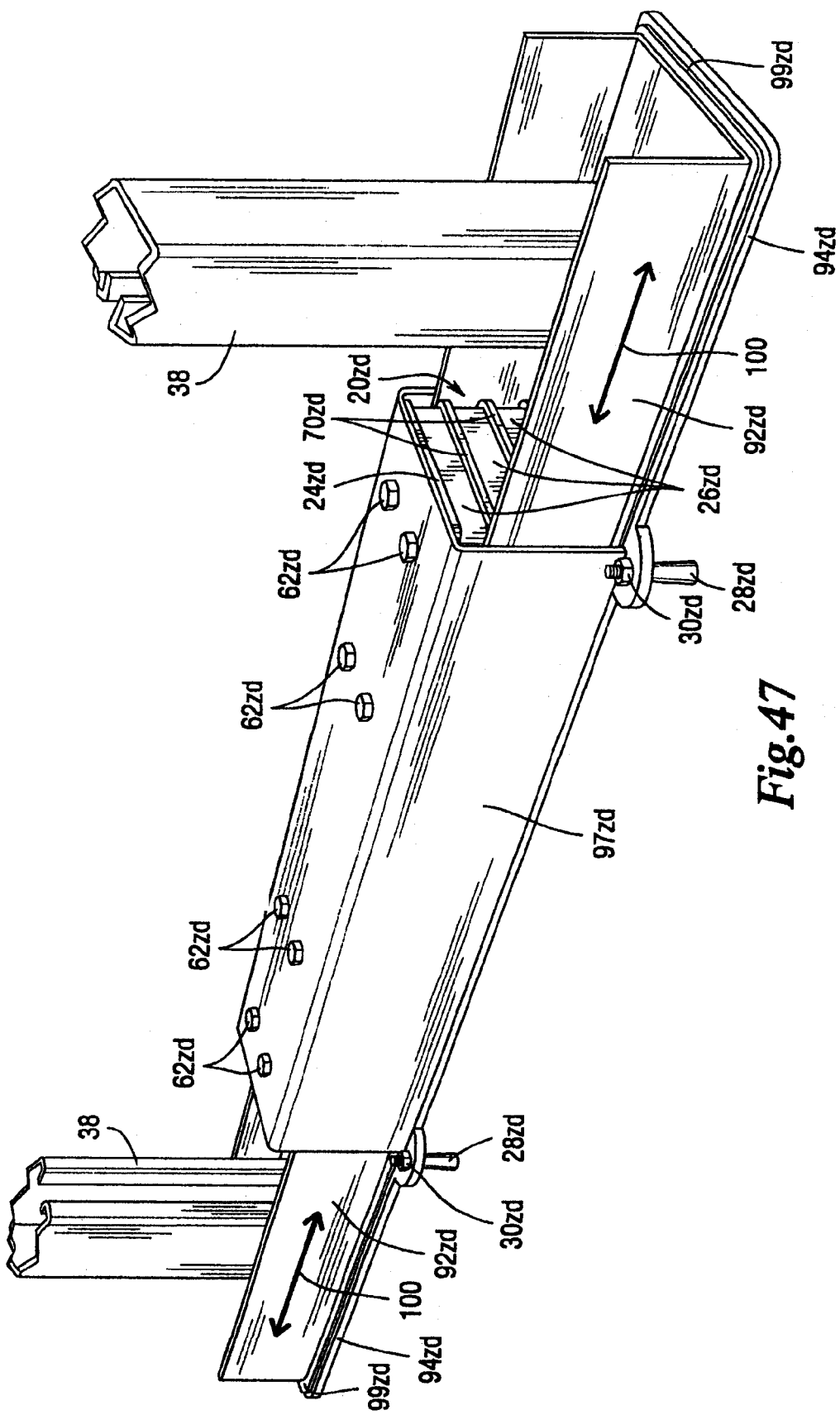
FIG. 47 is a perspective view of two storage rack vibration isolators attached to the storage racks by being attached to the sliding base pad that extends between two storage rack columns and attached to the floor by being attached to a restriction element that connects the vibration isolators to the fixed base pad.

The storage rack vibration isolators do not have to be attached to the storage rack system at the top of the isolators as has been described above. FIG. 47 depicts a seismic vibration system in which the columns 38 are welded to the top of a sliding base pad 92zd that extends between and under the two columns 38 such that the storage rack vibration isolators 20zd are also attached to the sliding base pad 92zd. The sliding base pad 92zd is formed into a U-shaped trough to provide additional protection to the storage rack vibration isolators 20zd from side impacts. The sliding base pad 92zd sits on top of a fixed base pad 94zd. A restriction element 97zd is placed over and coupled to the storage rack vibration isolators 20zd with plate screws 62zd. The restriction element is welded to the fixed base pad 94zd thereby connecting the storage rack vibration isolator 20zd to the floor.

During seismic events, while the restriction element 97zd remains fixed, the sliding base pad 92zd with the storage rack vibration isolators 20zd slides through the tunnel created by the restriction element 97zd and the fixed base pad 94zd. The sliding base pad 92zd projects over the end of the fixed base pad 94zd to about the extent of the movement of storage rack system during each vibration cycle while supporting the columns 38 mounted on it. The protrusion of the sliding base pad 92zd into the aisle prior to an earthquake can be minimized by minimizing or eliminating the extension of the sliding base pad 92zd, the fixed base pad 94zd, and the low friction bearing material 99zd beyond the outside end of the column 38. The structure of the restriction element 97zd serves to restrict the horizontal movement of the storage rack vibration isolator 20zd to substantially one horizontal directional parallel to the fixed base pad 94zd in the direction depicted by the directional arrows 100, as well as to substantially restrict vertical movement of the storage rack vibration isolator 20zd. As with other embodiments, the potential energy stored in the elastomeric members 26zd biases them to return the storage rack system to substantially its original position at the end of a seismic event. In between the sliding base pad 92zd and the fixed base pad 94zd is a layer of bearing material 99zd having a low coefficient of friction that helps the sliding base pad 91zd to slide over the fixed base pad 94zd.

Figure 48:
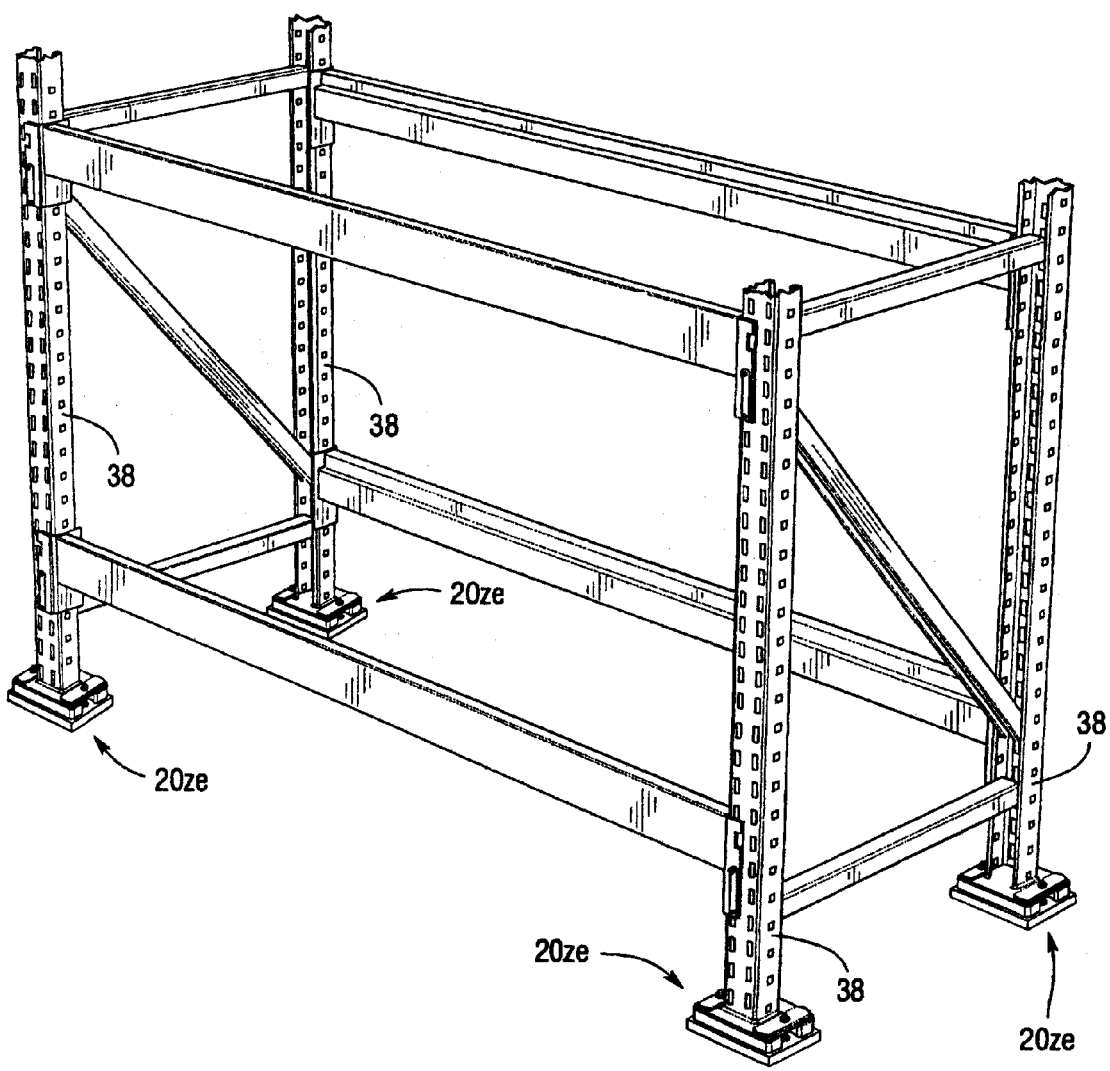
FIG. 48 is a perspective view of a storage rack system with storage rack vibration isolators welded to the bottom of each column of the storage rack system.
Figure 49:
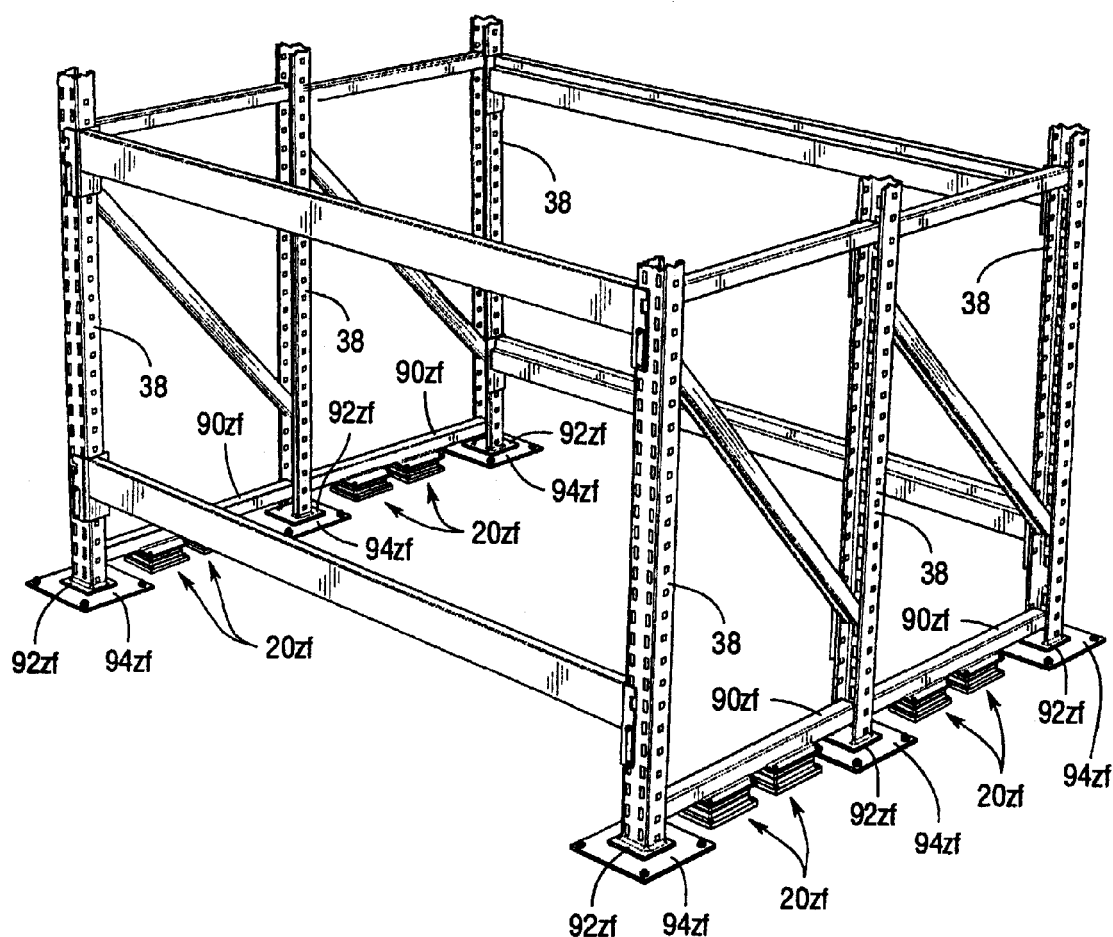
FIG. 49 is a perspective view of a storage rack system with storage rack vibration isolators attached to the storage rack system at cross braces that connect pairs of columns.
Figure 50:
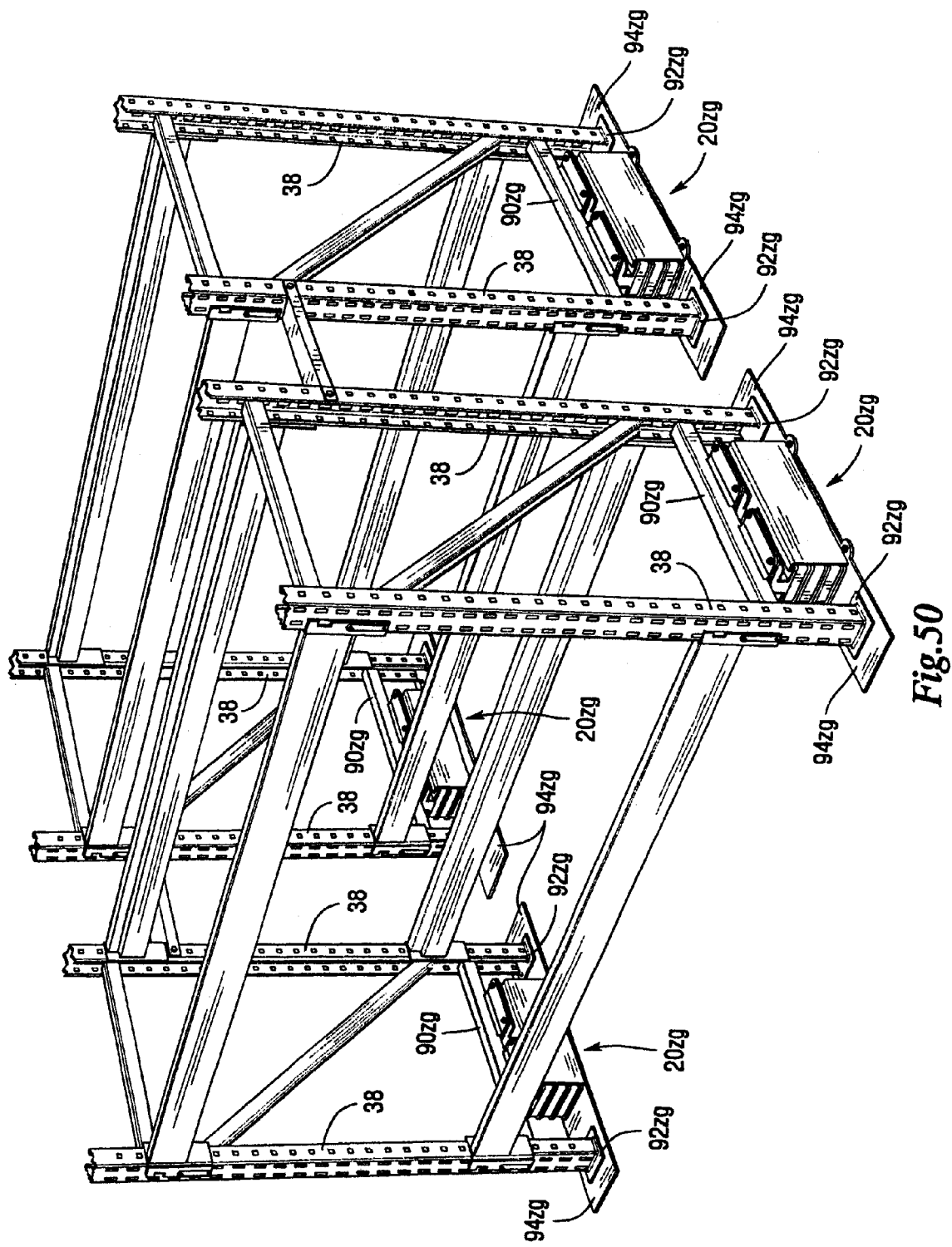
FIG. 50 is a perspective view of a storage rack system with storage rack vibration isolators attached to the storage rack system at cross braces that connect pairs of columns.

All of the embodiments disclosed above can be applied to a storage rack system comprising a plurality of columns not just one or two columns. Indeed, as has been discussed above, to ensure adequate protection for the storage rack system against seismic events, the design characteristics of the storage rack system must be taken into account. Existing storage rack systems can be retrofitted with storage rack vibration isolator units to ensure the entire storage rack system is adequately protected during seismic events. Storage rack systems could also be designed with the storage rack vibration isolators installed during their construction. FIGS. 48 through 50 depict storage rack vibration isolators attached to various storage rack systems and illustrate the application of the storage rack vibration isolators to complete storage rack systems. Other configurations and designs of storage rack systems could work just as well.

FIG. 48 depicts a storage rack system with storage rack vibration isolators 20ze attached to the lower ends of each column and to the floor. FIG. 49 depicts a six-column storage rack system with the storage rack vibration isolators 20zf attached between the columns of a storage rack system 38. Storage rack vibration isolators 20zf are attached to cross braces 90zf between pairs of columns 38. Each column in the system is welded to a sliding base pad 92zf and position over a fixed base pad 94zf on which the column may slide. FIG. 50 depicts a storage rack system with eight columns with storage rack vibration isolators 20zg installed between the columns 38. In this case the storage rack vibration isolators 20zg are an embodiment described above, which include structures that mechanically restricted to movement in substantially one horizontal direction corresponding to the cross-aisle direction of the storage rack system, i.e. the direction in which the storage rack is stiffer. It will be appreciated that the particular embodiments of storage rack vibration isolators depicted in FIGS. 48 through 50 are shown by way of example and any of the embodiments, or combination of embodiments, of storage rack vibration isolators previously described would work equally well.

As has been discussed, because the storage rack system is less flexible in the cross-aisle direction than in the down-aisle direction, the elastomers must be selected to at least lower the natural frequency of the whole storage rack system in at least the cross-aisle direction. It has been calculated that for storage rack systems with a design maximum load capacity of about 40,000 lbs comprising of three rows of two columns each in the less flexible cross-aisle direction, a storage rack vibration isolator system that has a total shear stiffness of about 1,600 lbs/in for the entire storage rack system and allows the columns to move about five inches in both directions from their resting positions for a total of about ten inches of peak-to-peak distance would reduce the natural frequency of the storage rack to about 0.6 Hz in the cross-aisle direction.

Seismic testing has been successfully conducted on this type of storage rack system having a 40,000 lb. load distributed on two bays three and four levels high typical of a warehouse retail store configuration. The storage rack system comprised three rows of columns having two columns each in the less flexible, cross-aisle direction. Two storage rack vibration isolators were installed between each row of two columns in the less flexible cross-aisle direction in the configuration shown in FIGS. 42 and 47. The tests were conducted in accordance with the AC-156 Accepted Criteria For Seismic Qualification by Shake-Table Testing of Non-structural Components and Systems of ICC Evaluation Services to achieve performance levels as outlined in the Federal Emergency Management Agency's FEMA 460 Seismic Considerations for Steel Storage Racks Located in Areas Accessible to the Public. The storage rack systems mounted on the shake tables were subjected to amplitudes corresponding to up to 200% of the AC-156 qualification levels. Each of the six storage rack vibration isolators had a static shear stiffness of about 270 lbs/in. for a total of 1,600 lbs/in and the ends of the elastomers moved under shear sufficiently to allow the columns to move about five inches in each direction from their resting positions for a total of about ten inches of peak-to-peak distance. This storage rack systems did not suffer any significant damage and the loads did not fall off the racks. The number of columns of the storage rack system does not limit the number of storage rack vibration isolator units that can be used. Additional storage rack vibration isolator units could be installed between the columns to achieve appropriate results if there is room for them.

It has been determined that elastomeric components made of butyl rubber (ASTM D2000 4AA 415 A13 Z1) with a stiffness of about 40 durometer and a loss factor of about 0.3 are suitable for use in storage rack systems with design maximum loads of up to about 10,000 lbs per upright frame. Elastomeric components made of butyl rubber with a stiffness of about 40 durometer could be used for storage rack systems with maximum design loads of up to about 20,000 lbs. per upright frame. Additional damping could be provided to limit the larger travel requirements of the softer elastomers. It has been determined that elastomeric components made of butyl rubber (ASTM D2000 4AA 615 A13 Z1) with a stiffness of about 60 durometer and a loss factor of about 0.45 are suitable for use in storage rack systems with maximum design loads of between about 10,000 lbs. and about 20,000 lbs. per upright frame. Additional testing should be conducted to determine optimal characteristics for the elastomeric components for various designs of storage racks with various design load ranges. If softer materials are used for applications across the range of maximum design loads of storage rack systems, additional damping may be incorporated into the elastomeric component. This could be achieved by including deformable lead cores, polymeric yielding devices, metallic yielding devices, or other devices into the elastomeric components. Other secondary damping elements, such as hydraulic shock absorbers, could be added in parallel with the isolation damper.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

What is claimed:

1. A storage rack vibration isolator for a storage rack system installed on a floor comprising:
   a first mounting plate connectable to the storage rack system;
   a second mounting plate connectable to the floor; and
   an elastomeric component extending between said first and second mounting plates and operatively attached to said first and second mounting plates so that during seismic events said first and second mounting plates remain attached to said elastomeric component as said elastomeric component is placed in shear while said first and second mounting plates are able to move in planes substantially parallel to each other, said elastomeric component comprising at least one elastomeric member, said at least one elastomeric member made of material that is capable of absorbing and dissipating the energy of ground movement imparted to the storage rack system during seismic events while said material enables the storage rack system to move a sufficient distance relative to the floor to lower the natural frequency of the storage rack system in at least one horizontal direction.

2. The storage rack vibration isolator of claim 1 in which the elastomeric component is chosen to reduce the natural frequency of the storage rack system in at least the one horizontal direction to about 0.9 Hz or less.

3. The storage rack vibration isolator of claim 1 in which the elastomeric component is chosen to reduce the natural frequency of the storage rack system in at least the one horizontal direction to about 0.5 Hz or less.

4. The storage rack vibration isolator of claim 1 in which said elastomeric component further comprises:
   at least two elastomeric members; and
   at least one intermediate plate positioned between every two said at least two elastomeric members.

5. The storage rack vibration isolator of claim 1 in which said at least one elastomeric member is made of a material from the group consisting of polyisoprene, polyisoprene blend, butyl rubber, acryl rubber, polyurethane, flurorubber, polysulfide rubber, ethylene-propylene rubber (EPR and EPDM), Hypalon, chlorinated polyethylene, ethylene-vinyl acetate rubber, epichlorohydrin rubber, chloroprene rubber, and silicone.

6. The storage rack vibration isolator of claim 1 in which said at least one elastomeric member is made of a material that has a damping loss factor greater than about 0.1.

7. A storage rack vibration isolator for a storage rack system installed on a floor comprising:
   a first mounting plate connectable to the storage rack system;
   a second mounting plate connectable to the floor;
   an elastomeric component extending between said first and second mounting plates and operatively attached to said first and second mounting plates so that during seismic events said first and second mounting plates remain attached to said elastomeric component as said elastomeric component is placed in shear while said first and second mounting plates are able to move in planes substantially parallel to each other, said elastomeric component comprising at least one elastomeric member, said at least one elastomeric member made of material that is capable of absorbing and dissipating the energy of ground movement imparted to the storage rack system during seismic events while said material enables the storage rack system to move a sufficient distance relative to the floor to lower the natural frequency of the storage rack system in at least one horizontal direction; and
   a structure that restricts the movement of said elastomeric component to substantially the one horizontal direction.

8. The storage rack vibration isolator of claim 7 in which said structure that restricts the movement of said elastomeric component to substantially one horizontal direction allows a limited amount of movement in another horizontal direction.

9. The storage rack vibration isolator of claim 7 which includes a structure that substantially restricts the movement of said elastomeric component in a vertical direction.

10. The storage rack vibration isolator of claim 7 which includes a structure that substantially restricts the movement of said elastomeric component in a vertical direction so as to allow a limited amount of movement in the vertical direction.

11. The storage rack vibration isolator of claim 7 in which said elastomeric component is configured to function primarily in the one horizontal direction.

12. The storage rack vibration isolator of claim 7 further comprising:
   said elastomeric component configured to function primarily in the one horizontal direction; and
   a structure that substantially restricts the movement of said elastomeric component in a vertical direction.

13. The storage rack vibration isolator of claim 7 in which the elastomeric component is chosen to reduce the natural frequency of the storage rack system in at least the one horizontal direction to about 0.9 Hz or less.

14. The storage rack vibration isolator of claim 7 in which the elastomeric component is chosen to reduce the natural frequency of the storage rack system in at least the one horizontal direction to about 0.5 Hz or less.

15. The storage rack vibration isolator of claim 7 in which said elastomeric component further comprises:
   at least two elastomeric members; and
   at least one intermediate plate positioned between every two said at least two elastomeric members.

16. The storage rack vibration isolator of claim 7 in which said at least one elastomeric member is made of a material from the group consisting of polyisoprene, polyisoprene blend, butyl rubber, acryl rubber, polyurethane, flurorubber, polysulfide rubber, ethylene-propylene rubber (EPR and EPDM), Hypalon, chlorinated polyethylene, ethylene-vinyl acetate rubber, epichlorohydrin rubber, chloroprene rubber, and silicone.

17. The storage rack vibration isolator of claim 7 in which said at least one elastomeric member is made of a material that has a damping loss factor greater than about 0.1.

18. A storage rack system installed on a floor comprising:
   a plurality of columns having lower ends that are moveable with respect to the floor;
   at least one storage rack vibration isolator; and
   said at least one storage rack vibration isolator comprising a first mounting plate connected to said storage rack system, a second mounting plate connected to the floor, and an elastomeric component extending between said first and second mounting plates and operatively attached to said first and second mounting plates so that during seismic events said first and second mounting plates remain attached to said elastomeric component as the elastomeric component is placed in shear while said first and second mounting plates are able to move in planes substantially parallel to each other, said elastomeric component comprising at least one elastomeric member made of material that is capable of absorbing and dissipating the energy of ground movement imparted to the storage rack system during seismic events while said plurality of columns moves with respect to the floor while said material enables the storage rack system to move a sufficient distance relative to the floor to lower the natural frequency of the storage rack system in at least one horizontal direction.

19. The storage rack system of claim 18 further comprising said at least one storage rack vibration isolator mounted between the lower end of at least one of said columns and the floor.

20. The storage rack system of claim 18 further comprising said at least one storage rack vibration isolator mounted between the lower end of each said column and the floor.

21. The storage rack system of claim 18 further comprising said at least one storage rack vibration isolator mounted adjacent the lower end of at least one of said columns and the floor.

22. The storage rack system of claim 18 further comprising said at least one storage rack vibration isolator mounted adjacent the lower end of each said column and the floor.

23. The storage rack system of claim 18 in which the elastomeric component is chosen to reduce the natural frequency of the storage rack system in at least the one horizontal direction to about 0.9 Hz or less.

24. The storage rack system of claim 18 in which the elastomeric component is chosen to reduce the natural frequency of the storage rack system in at least the one horizontal direction to about 0.5 Hz or less.

25. The storage rack system of claim 18 in which said elastomeric component further comprises:
   at least two elastomeric members; and
   at least one intermediate plate positioned between every two said at least two elastomeric members.

26. The storage rack system of claim 18 in which said at least one elastomeric member is made of a material from the group consisting of polyisoprene, polyisoprene blend, butyl rubber, acryl rubber, polyurethane, flurorubber, polysulfide rubber, ethylene-propylene rubber (EPR and EPDM), Hypalon, chlorinated polyethylene, ethylene-vinyl acetate rubber, epichlorohydrin rubber, chloroprene rubber, and silicone.

27. The storage rack system of claim 18 in which said at least one elastomeric member is made of a material that has a damping loss factor greater than about 0.1.

28. A storage rack system installed on a floor comprising:
   a plurality of columns having lower ends that are moveable with respect to the floor;
   at least one storage rack vibration isolator;
   said at least one storage rack vibration isolator comprising a first mounting plate connected to said storage rack system, a second mounting plate connected to the floor, and an elastomeric component extending between said first and second mounting plates and operatively attached to said first and second mounting plates so that during seismic events said first and second mounting plates remain attached to said elastomeric component as the elastomeric component is placed in shear while said first and second mounting plates are able to move in planes substantially parallel to each other, said elastomeric component comprising at least one elastomeric member made of material that is capable of absorbing and dissipating the energy of ground movement imparted to the storage rack system during seismic events while said plurality of columns moves with respect to the floor while said material enables the storage rack system to move a sufficient distance relative to the floor to lower the natural frequency of the storage rack system in at least one horizontal direction; and
   a structure that restricts the movement of said elastomeric component to substantially the one horizontal direction.

29. The storage rack system of claim 28 in which said structure that restricts the movement of said elastomeric component to substantially one horizontal direction allows a limited amount of movement in another horizontal direction.

30. The storage rack system of claim 28 in which said at least one storage rack vibration isolator includes a structure that substantially restricts the movement of said elastomeric component in a vertical direction.

31. The storage rack system of claim 28 in which said structure that substantially limits the movement of said elastomeric component in a vertical direction allows a limited amount of movement in the vertical direction.

32. The storage rack system of claim 28 in which said elastomeric component of said at least one storage rack vibration isolator is configured to function primarily in the one horizontal direction.

33. The storage rack system of claim 28 further comprising:
   said elastomeric component of said at least one storage rack vibration isolator is configured to function primarily in the one horizontal direction; and
   said at least one storage rack vibration isolator includes a structure that substantially restricts the movement of said elastomeric component in a vertical direction.

34. The storage rack system of claim 28 further comprising said at least one storage rack vibration isolator mounted between the lower end of at least one of said columns and the floor.

35. The storage rack system of claim 28 further comprising said at least one storage rack vibration isolator mounted between the lower end of each said column and the floor.

36. The storage rack system of claim 28 further comprising said at least one storage rack vibration isolator mounted adjacent the lower end of at least one of said columns and the floor.

37. The storage rack system of claim 28 further comprising said at least one storage rack vibration isolator mounted adjacent the lower end of each said column and the floor.

38. The storage rack system of claim 28 in which the elastomeric component is chosen to reduce the natural frequency of the storage rack system in at least the one horizontal direction to about 0.9 Hz or less.

39. The storage rack system of claim 28 in which the elastomeric component is chosen to reduce the natural frequency of the storage rack system in at least the one horizontal direction to about 0.5 Hz or less.

40. The storage rack system of claim 28 in which said elastomeric component further comprises:
   at least two elastomeric members; and
   at least one intermediate plate positioned between every two said at least two elastomeric members.

41. The storage rack system of claim 28 in which said at least one elastomeric member is made of a material from the group consisting of polyisoprene, polyisoprene blend, butyl rubber, acryl rubber, polyurethane, flurorubber, polysulfide rubber, ethylene-propylene rubber (EPR and EPDM), Hypalon, chlorinated polyethylene, ethylene-vinyl acetate rubber, epichlorohydrin rubber, chloroprene rubber, and silicone.

42. The storage rack system of claim 28 in which said at least one elastomeric member is made of a material that has a damping loss factor greater than about 0.1.

43. The storage rack system of claim 28 which includes at least one storage rack vibration isolator mounted adjacent the lower end of at least one of said columns.

* * * * *